US012700926B2

(12) United States Patent
Raval et al.

(10) Patent No.: US 12,700,926 B2
(45) Date of Patent: *Aug. 4, 2026

(54) OPTICAL COMMUNICATION SYSTEM WITH A SIMPLIFIED REMOTE OPTICAL POWER SUPPLY

(71) Applicant: Ayar Labs, Inc., Santa Clara, CA (US)

(72) Inventors: Manan Raval, Oakland, CA (US); Matthew Sysak, Sunnyvale, CA (US); Chen Li, Santa Clara, CA (US)

(73) Assignee: Ayar Labs, Inc., San Jose, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/174,860

(22) Filed: Feb. 27, 2023

(65) Prior Publication Data

US 2023/0275671 A1 Aug. 31, 2023

Related U.S. Application Data

(60) Provisional application No. 63/315,068, filed on Feb. 28, 2022.

(51) Int. Cl.
*H04B 10/50* (2013.01)
*G02B 6/12* (2006.01)
(Continued)

(52) U.S. Cl.
CPC ....... *H04B 10/504* (2013.01); *G02B 6/12004* (2013.01); *G02B 6/1225* (2013.01);
(Continued)

(58) Field of Classification Search
CPC .... H04B 10/501; H04B 10/504; H04B 10/67; H04J 14/0202; H04J 14/0227
(Continued)

(56) References Cited

U.S. PATENT DOCUMENTS 5,784,183 A * 7/1998 Aoki ..................... H01S 5/4031
398/79
5,870,216 A * 2/1999 Brock ................ H04Q 11/0001
398/68
(Continued)

FOREIGN PATENT DOCUMENTS

CN 113141548 A * 7/2021 ......... H04Q 11/0067

OTHER PUBLICATIONS

PCT Application No. PCT/US23/13948, International Search Report and Written Opinion, mailed Jun. 7, 2023.

*Primary Examiner* — Li Liu
(74) *Attorney, Agent, or Firm* — Penilla IP, APC

(57) ABSTRACT

An electro-optical chip includes a plurality of transmit macros, each of which includes an optical waveguide and a plurality of ring resonators positioned along the optical waveguide. An optical distribution network is implemented onboard the electro-optical chip and includes a plurality of optical inputs and a plurality of optical outputs. The optical distribution network conveys a portion of light received at a subset of the plurality of optical inputs to one or more of the plurality of optical outputs, such that light conveyed to said one or more of the plurality of optical outputs includes wavelengths of light conveyed to said subset of the plurality of optical inputs. The subset of the plurality of optical inputs includes at least two of the plurality of optical inputs. Each of the plurality of optical outputs is optically connected to the optical waveguide in a corresponding one of the plurality of transmit macros.

27 Claims, 15 Drawing Sheets

(51) Int. Cl.

| | |
|---|---|
| *G02B 6/122* | (2006.01) |
| *G02B 6/124* | (2006.01) |
| *H04B 10/2519* | (2013.01) |
| *H04B 10/294* | (2013.01) |
| *H04B 10/67* | (2013.01) |
| *H04J 14/02* | (2006.01) |

(52) U.S. Cl.
CPC ......... *G02B 6/124* (2013.01); *H04B 10/2519* (2013.01); *H04B 10/294* (2013.01); *H04B 10/501* (2013.01); *H04B 10/67* (2013.01); *H04J 14/0202* (2013.01); *H04J 14/0227* (2013.01)

(58) Field of Classification Search
USPC ............................... 398/50, 66, 79, 200, 201
See application file for complete search history.

(56) References Cited

U.S. PATENT DOCUMENTS

| | | | | |
|---|---|---|---|---|
| 7,539,418 B1 * | 5/2009 | Krishnamoorthy | ..... | G02F 1/011 |
| | | | | 398/48 |
| 2005/0158050 A1 * | 7/2005 | Ridgway | ............ | H04J 14/0226 |
| | | | | 398/79 |
| 2009/0304390 A1 * | 12/2009 | Tanushi | ............... | H04B 10/801 |
| | | | | 398/139 |
| 2012/0141140 A1 * | 6/2012 | Neilson | .............. | H04B 10/2587 |
| | | | | 398/171 |
| 2015/0125152 A1 | 5/2015 | Ji et al. | | |
| 2015/0132015 A1 * | 5/2015 | Hayakawa | ............... | G02B 6/28 |
| | | | | 385/2 |
| 2015/0163570 A1 * | 6/2015 | Zid | ...................... | H04B 10/278 |
| | | | | 398/45 |
| 2017/0078772 A1 * | 3/2017 | Rickman | ............ | H04Q 11/0071 |
| 2017/0098917 A1 * | 4/2017 | Popovic | ............... | H04B 10/503 |
| 2017/0139162 A1 * | 5/2017 | Han | ...................... | G02B 6/4281 |
| 2017/0141870 A1 * | 5/2017 | Testa | ................. | H04Q 11/0066 |
| 2020/0021384 A1 * | 1/2020 | Stojanovic | ......... | H04Q 11/0071 |
| 2020/0021385 A1 * | 1/2020 | Stojanovic | .......... | H04J 14/0209 |
| 2020/0021899 A1 * | 1/2020 | Stojanovic | .......... | H04J 14/0267 |
| 2020/0204284 A1 * | 6/2020 | Huang | ................. | H04B 10/293 |
| 2020/0284981 A1 * | 9/2020 | Harris | ................... | G02B 6/136 |
| 2020/0355880 A1 * | 11/2020 | Wright | ................ | G02B 6/4215 |
| 2020/0382215 A1 * | 12/2020 | Sun | ...................... | H04B 10/801 |
| 2021/0058159 A1 * | 2/2021 | Krichevsky | ........ | H04B 10/0795 |
| 2021/0257021 A1 | 8/2021 | Meade et al. | | |
| 2021/0286129 A1 | 9/2021 | Fini et al. | | |
| 2021/0359766 A1 | 11/2021 | Sysak et al. | | |
| 2022/0045780 A1 | 2/2022 | Stojanovic et al. | | |

\* cited by examiner

OPTICAL COMMUNICATION SYSTEM WITH A SIMPLIFIED REMOTE OPTICAL POWER SUPPLY

CROSS-REFERENCE TO RELATED APPLICATIONS

This application claims priority under 35 U.S.C. 119 to U.S. Provisional Patent Application No. 63/315,068, filed on Feb. 28, 2022, the disclosure of which is incorporated herein by reference in its entirety for all purposes.

BACKGROUND OF THE INVENTION

1. Field of the Invention

The disclosed embodiments relate to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient laser light sources. Also, it is desirable for the laser light sources of optical data communication systems to have a minimal form factor and be designed as efficiently as possible with regard to expense and energy consumption. It is within this context that the present disclosed embodiments arise.

SUMMARY OF THE INVENTION

In an example embodiment, an electro-optical chip is disclosed. The electro-optical chip includes a plurality of transmit macros. Each of the plurality of transmit macros includes an optical waveguide and a plurality of ring resonators positioned along the optical waveguide. The plurality of ring resonators are positioned within an evanescent optical coupling distance of the optical waveguide. The electro-optical chip also includes an optical distribution network implemented onboard the electro-optical chip. The optical distribution network has a plurality of optical inputs and a plurality of optical outputs. The optical distribution network is configured to convey a portion of light received at each and every one of the plurality of optical inputs to each of the plurality of optical outputs, such that light conveyed to each of the plurality of optical outputs includes all wavelengths of light conveyed to the plurality of optical inputs. Each of the plurality of optical outputs is optically connected to the optical waveguide in a corresponding one of the plurality of transmit macros.

In an example embodiment, an optical data communication system is disclosed. The optical data communication system includes an optical power supply. The optical power supply includes a plurality of lasers. Each of the plurality of lasers is configured to generate and output a beam of continuous wave light of a different one of a plurality of wavelengths, such that the beams of continuous wave light output by the plurality of lasers collectively include all of the plurality of wavelengths. The optical data communication system also includes an electro-optical chip that exists separate and remote from the optical power supply. The electro-optical chip includes a plurality of transmit macros. Each of the plurality of transmit macros includes an optical waveguide and a plurality of ring resonators positioned along the optical waveguide. The plurality of ring resonators are positioned within an evanescent optical coupling distance of the optical waveguide. The electro-optical chip also includes an optical distribution network implemented onboard the electro-optical chip. The optical distribution network has a plurality of optical inputs and a plurality of optical outputs. The optical distribution network is configured to convey a portion of light received at each and every one of the plurality of optical inputs to each of the plurality of optical outputs, such that light conveyed to each of the plurality of optical outputs includes all wavelengths of light conveyed to the plurality of optical inputs. Each of the plurality of optical outputs of the optical distribution network is optically connected to the optical waveguide in a corresponding one of the plurality of transmit macros. The optical data communication system also includes an optical network configured to optically convey the beams of continuous wave light as output by the plurality of lasers within the optical power supply to respective ones of the plurality of optical inputs of the optical distribution network within the electro-optical chip. Each one of the plurality of optical inputs of the optical distribution network is connected to receive a different one of the beams of continuous wave light as output by the plurality of lasers.

In an example embodiment, a method is disclosed for generating a modulated optical data communication signal. The method includes operating an optical power supply to generate a plurality of beams of continuous wave light. Each of the plurality of beams of continuous wave light has a different wavelength. The method also includes conveying the plurality of beams of continuous wave light from the optical power supply to an electro-optical chip that exists separate and remote from the optical power supply. The method also includes operating the electro-optical chip to multiplex the plurality of beams of continuous wave light onto an optical waveguide within the electro-optical chip, such that all of the wavelengths of the plurality of beams of continuous wave light are coupled into the optical waveguide. The method also includes conveying the plurality of beams of continuous wave light through the optical waveguide to an optical transmitter portion of an optical macro within the electro-optical chip. The method also includes operating the optical transmitter portion of the optical macro within the electro-optical chip to modulate one or more of the beams of continuous wave light from within the optical waveguide to generate one or more modulated light signals that convey digital data.

In an example embodiment, an electro-optical chip is disclosed. The electro-optical chip includes a plurality of transmit macros. Each of the plurality of transmit macros includes an optical waveguide and a plurality of ring resonators positioned along the optical waveguide within an evanescent optical coupling distance of the optical waveguide. The electro-optical chip includes an optical distribution network implemented onboard the electro-optical chip. The optical distribution network has a plurality of optical inputs and a plurality of optical outputs. The optical distribution network is configured to convey a portion of light received at a subset of the plurality of optical inputs to one or more of the plurality of optical outputs, such that light conveyed to said one or more of the plurality of optical outputs includes wavelengths of light conveyed to said subset of the plurality of optical inputs. The subset of the plurality of optical inputs includes at least two of the plurality of optical inputs. Each of the plurality of optical outputs is optically connected to the optical waveguide in a corresponding one of the plurality of transmit macros.

In an example embodiment, an optical data communication system is disclosed. The optical data communication system includes an optical power supply that includes a plurality of lasers. Each of the plurality of lasers is configured to generate and output a beam of continuous wave light of a different one of a plurality of wavelengths, such that beams of continuous wave light output by the plurality of lasers collectively include all of the plurality of wavelengths. The optical data communication system also includes an electro-optical chip that exists separate and remote from the optical power supply. The electro-optical chip includes a plurality of transmit macros. Each of the plurality of transmit macros includes an optical waveguide and a plurality of ring resonators positioned along the optical waveguide within an evanescent optical coupling distance of the optical waveguide. The electro-optical chip includes an optical distribution network implemented onboard the electro-optical chip. The optical distribution network has a plurality of optical inputs and a plurality of optical outputs. The optical distribution network is configured to convey a portion of light received at a subset of the plurality of optical inputs to one or more of the plurality of optical outputs, such that light conveyed to each of said one or more of the plurality of optical outputs includes wavelengths of light conveyed to the subset of the plurality of optical inputs. The subset of the plurality of optical inputs includes at least two of the plurality of optical inputs. Each of the plurality of optical outputs of the optical distribution network is optically connected to the optical waveguide in a corresponding one of the plurality of transmit macros. The optical data communication system also includes an optical network configured to optically convey the beams of continuous wave light as output by the plurality of lasers within the optical power supply to respective ones of the plurality of optical inputs of the optical distribution network within the electro-optical chip. Each one of the plurality of optical inputs of the optical distribution network is connected to receive a different one of the beams of continuous wave light as output by the plurality of lasers.

In an example embodiment, a method is disclosed for generating a modulated optical data communication signal. The method includes operating an optical power supply to generate a plurality of beams of continuous wave light, where each of the plurality of beams of continuous wave light has a different wavelength. The method also includes conveying the plurality of beams of continuous wave light from the optical power supply to an electro-optical chip that exists separate and remote from the optical power supply. The method also includes operating the electro-optical chip to multiplex at least a subset of the plurality of beams of continuous wave light onto an optical waveguide within the electro-optical chip, such that at least a subset of the wavelengths of the plurality of beams of continuous wave light are coupled into the optical waveguide. The subset of the wavelengths of the plurality of beams of continuous wave light include at least two different wavelengths of continuous wave light. The method also includes conveying said at least the subset of the plurality of beams of continuous wave light through the optical waveguide to an optical transmitter portion of an optical macro within the electro-optical chip. The method also includes operating the optical transmitter portion of the optical macro within the electro-optical chip to modulate one or more of the beams of continuous wave light from within the optical waveguide to generate one or more modulated light signals that convey digital data.

Other aspects and advantages of the disclosed embodiments will become more apparent from the following detailed description, taken in conjunction with the accompanying drawings, illustrating by way of example the disclosed embodiments.

DETAILED DESCRIPTION OF THE INVENTION

Figure 1A:
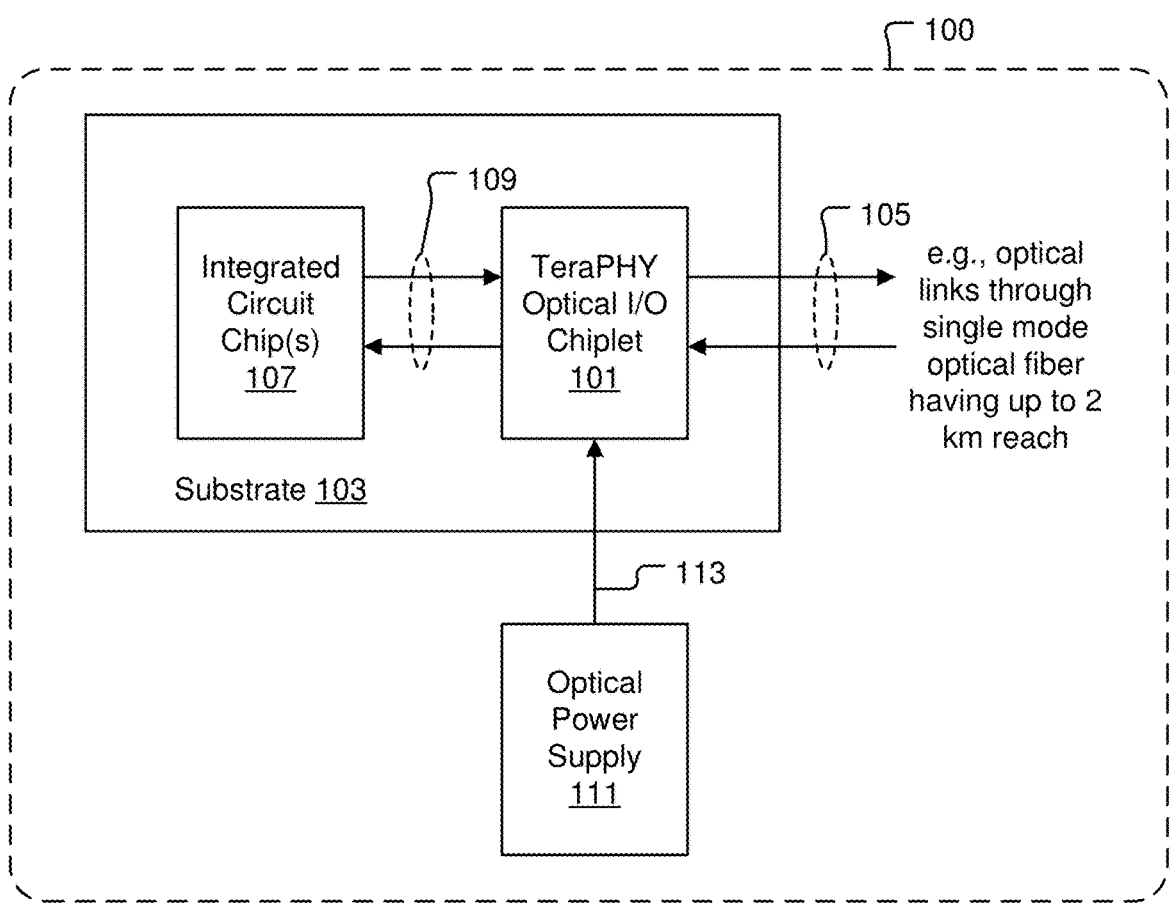
FIG. 1A shows an example block-level architecture of a system implementing an electro-optical chip, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

The present invention relates to optical data communication. High bandwidth, multi-wavelength WDM (Wavelength-Division Multiplexing) systems are necessary to meet the needs of increasing interconnect bandwidth requirements. In some implementations of these WDM systems, a laser source includes a remote laser array configured to generate multiple wavelengths of continuous wave (CW) laser light which are combined through an optical distribution network to provide multiple wavelengths of laser light to each of many optical output ports of the laser source. The multiple wavelengths of laser light are transmitted from any one or more of the optical output ports of the laser source to an electro-optical chip, such as to a CMOS (Complementary Metal Oxide Semiconductor) and/or an SOI (silicon-on-insulator) photonic/electronic chip, that sends and receives data in an optical data communication system. In some embodiments, the multi-wavelength laser light source includes an array of lasers that have outputs optically connected to respective optical inputs of an optical distribution network that routes each incoming wavelength of CW laser light to each of multiple optical output ports of the optical distribution network. The multiple wavelengths of CW laser light are then routed from a given optical output port of the optical distribution network to a given optical input supply port of the electro-optical chip.

In some embodiments, the multi-wavelength laser light source includes an array of lasers that have outputs optically connected to respective optical fibers. Each laser in the array of lasers is configured to generate a single wavelength of CW laser light. And, each laser in the array of lasers is configured to generate a different wavelength of CW than the other lasers in the array of lasers. In these embodiments, the optical fibers convey the respective wavelengths of CW laser light to respective optical supply inputs of the electro-optical chip. The optical supply inputs of the electro-optical chip are optically connected to an optical distribution network onboard the electro-optical chip. Each of multiple optical inputs of the optical distribution network is optically connected to receive a respective wavelength of CW laser light by way of a respective optical fiber from a respective laser within the array of lasers of the multi-wavelength laser light source. The optical distribution network onboard the electro-optical chip is configured to route each incoming wavelength of CW laser light to each of multiple optical outputs of the optical distribution network, such that each of the multiple wavelengths of CW laser light received across the multiple optical inputs of the optical distribution network is conveyed to each of the multiple optical outputs of the optical distribution network. The multiple wavelengths of CW laser light are then routed from a given optical output of the optical distribution network onboard the electro-optical chip to an optical supply input of a transmitter portion of a given optical macro within the electro-optical chip.

FIG. 1A shows an example block-level architecture of a system 100 implementing an electro-optical chip 101, in accordance with some embodiments. In some embodiments, the electro-optical chip 101 is the TeraPHY™ chip produced by Ayar Labs, Inc., of Santa Clara, California, as described in U.S. patent application Ser. No. 17/184,537, which is incorporated herein by reference in its entirety for all purposes. The system 100 shows a general representation of a multi-chip package (MCP) that is implemented to include the electro-optical chip 101. The system 100 includes the electro-optical chip 101 attached to a substrate 103. The electro-optical chip 101 includes an optical interface that is optically connected to an optical link 105 through which bi-directional optical data communication is performed with another electro-optic device, such as with another electro-optical chip 101. In some embodiments, the system 100 also includes one or more integrated circuit chips 107 (semiconductor chips) attached to the substrate 103. In various embodiments, the one or more integrated circuit chips 107 includes one or more of a central processing unit (CPU), a graphics processing unit (GPU), a visual processing unit (VPU), an application specific integrated circuit (ASIC), a field programmable gate array (FPGA), a memory chip, an HBM stack, an SoC, a microprocessor, a microcontroller, a digital signal processor (DSP), an accelerator chip, and/or essentially any other type of semiconductor chip. In various embodiments, the substrate 103 is an organic package and/or interposer. In some embodiments, the substrate 103 includes electrical connections/routings 109 between the electro-optical chip 101 and the one or more integrated circuit chips 107. In some embodiments, the electrical connections/routings 109 are formed within a redistribution layer (RDL) structure formed within the substrate 103. In various embodiments, the RDL structure is implemented in accordance with essentially any RDL structure topology and technology available within the semiconductor packaging industry. Some of the electrical connections/routings 109 within the substrate 103 are configured and used to provide electrical power and reference ground potential to the electro-optical chip 101 and to each of the one or more semiconductor chips 107. Also, some electrical connections/routings 109 within the substrate 103 are configured and used to transmit electrical signals that provide for bi-directional digital data communication between the electro-optical chip 101 and the one or more semiconductor chips 107. In various embodiments, digital data communication through the electrical connections/routings 109 between the electro-optical chip 101 and the one or more semiconductor chips 107 is implemented in accordance with a digital data interconnect standard, such as the Peripheral Component Interconnect Express (PCIe) standard, the Compute Express Link (CXL) standard, the Gen-Z standard, the Open Coherent Accelerator Processor Interface (OpenCAPI), and/or the Open Memory Interface (OMI), among essentially any other digital data interconnect standard.

The system 100 also includes an optical power supply 111 optically connected to supply CW laser light of one or more controlled wavelengths to the electro-optical chip 101. In some embodiments, the optical power supply 111 is a SuperNova multi-wavelength, multi-port light supply provided by Ayar Labs, Inc. The optical power supply 111 supplies CW light that optically powers the electro-optical chip 101. In some embodiments, the optical power supply 111 is configured as a photonic integrated circuit (PIC) that generates multiple wavelengths of the CW light, multiplexes the multiple wavelengths of the CW light onto a common optical fiber or optical waveguide, and splits and amplifies the multiplexed optical power to multiple output ports of the optical power supply 111 for transmission to multiple corresponding CW light input ports of the electro-optical chip 101. In some other embodiments, the optical power supply 111 is configured as an array of lasers, where each laser in the array of lasers is configured to generate a respective wavelength of CW laser light. In these embodiments, the CW laser light generated by a given one of the lasers is transmitted to a respective one of multiple output ports of the optical power supply 111 for transmission to a respective one of multiple CW light input ports of the electro-optical chip 101.

In various embodiments, the optical power supply 111 is optically connected to the electro-optical chip 101 through one or more optical waveguides 113. In various embodiments, the one or more optical waveguides 113 includes one or more optical fibers and/or one or more optical waveguide structures formed within the substrate 103. In some embodiments, the optical power supply 111 is optically connected to the electro-optical chip 101 through an optical fiber array that includes multiple optical fibers, where each optical fiber in the optical fiber array is connected to carry a respective one of the multiple wavelengths of CW light generated by the array of lasers within the optical power supply 111. In some embodiments, the optical power supply 111 is attached to the substrate 103. In some embodiments, the optical power supply 111 receives electrical power and electrical control signals through electrical connections/routings formed within the substrate 103. Alternatively, in some embodiments, the optical power supply 111 is implemented as a device physically separate from the substrate 103. In some of these embodiments, the optical power supply 111 is physically remote from the electro-optical chip 101. In some of these embodiments, the optical power supply 111 is optically connected to the electro-optical chip 101 through one or more optical fibers that are optically connected to the substrate 103 and through one or more optical waveguides formed within the substrate 103.

Figure 1B:
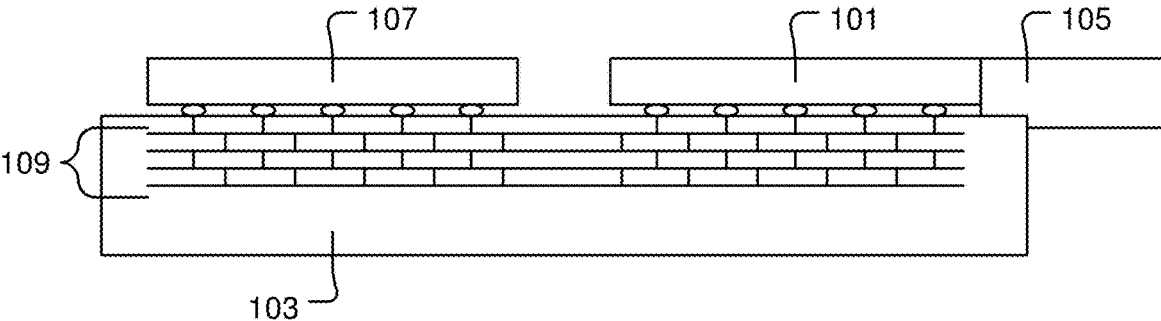
FIG. 1B shows a vertical cross-section diagram of the substrate of FIG. 1A, in accordance with some embodiments.

FIG. 1B shows a vertical cross-section diagram of the substrate 103 of FIG. 1A, in accordance with some embodiments. In some embodiments, the electrical connections/routings 109 of the RDL structure(s) are formed in multiple levels of the substrate 103. In some embodiments, the electrical connections/routings 109 include electrically conductive via structures formed to provide electrical connections between electrical traces formed in different levels of the substrate 103, as represented by the vertical lines between different levels of the electrical connections/routings 109 in FIG. 1B. It should be understood that in various embodiments the electrical connections/routings 109 are configured in essentially any manner as needed to provide required electrical connectivity between the integrated circuit chip(s) 107 and the electro-optical chip 101, and to provide electrical power to each of the integrated circuit chip(s) 107 and the electro-optical chip 101, and to provide a reference ground potential connection to each of the integrated circuit chip(s) 107 and the electro-optical chip 101.

Figure 2:
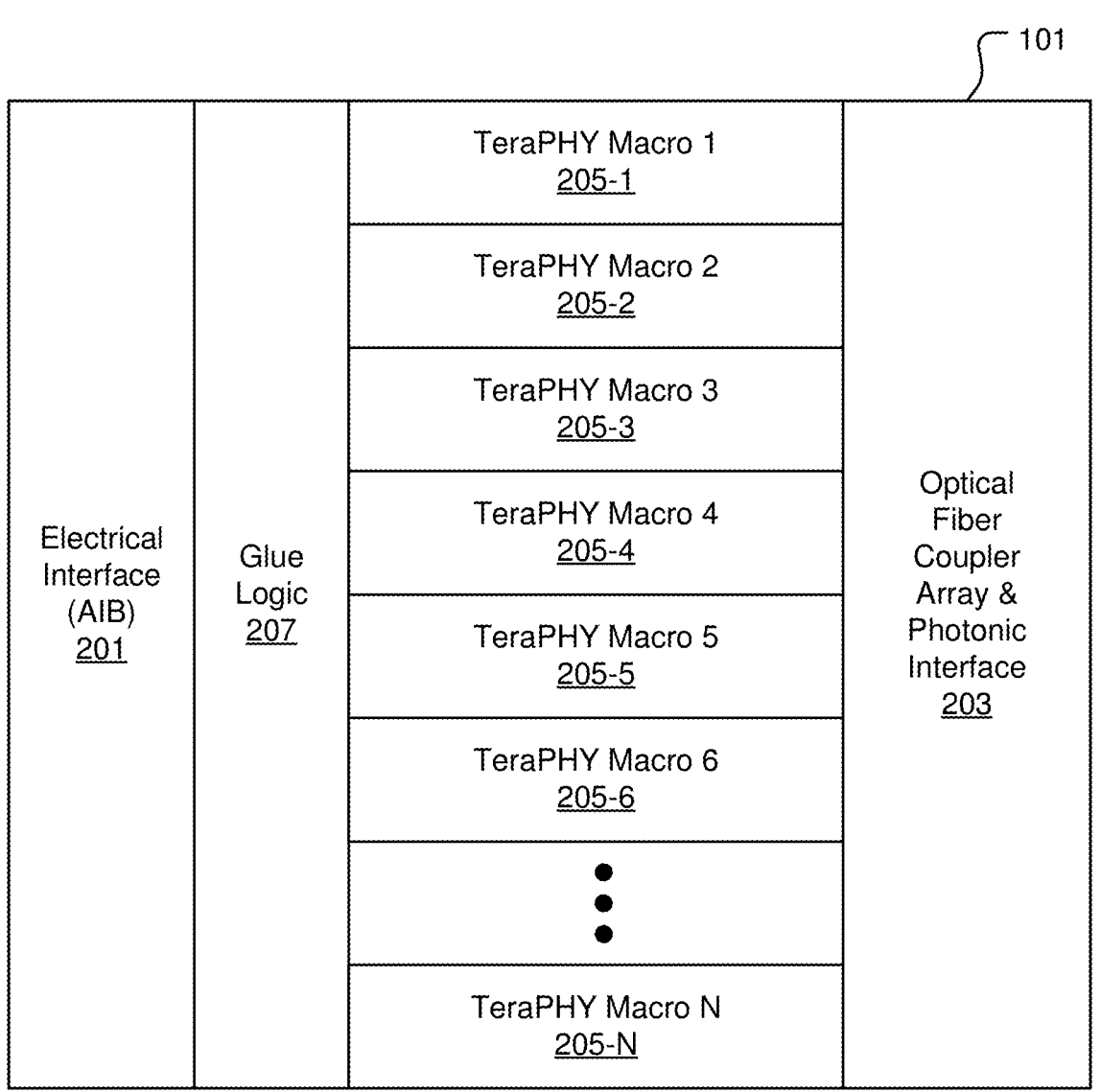
FIG. 2 shows an example organizational diagram of the electro-optical chip referenced herein, in accordance with some embodiments.

FIG. 2 shows an example organizational diagram of the electro-optical chip 101 referenced herein, in accordance with some embodiments. The organizational diagram has an electrical interface 201 separated (split) from a photonic interface 203. The photonic interface 203 is configured to optically couple with an optical fiber array. In the example of FIG. 2, the electrical interface 201 is on a left side of the electro-optical chip 101, and the photonic interface 203 is on a right side of the electro-optical chip 101. A number (1 to N) of optical macros 205-1 to 205-N are located between the photonic interface 203 and the electrical interface 201. The electrical interface 201 is connected to the optical macros 205-1 to 205-N by glue logic 207. The electrical interface 201 of the electro-optical chip 101 is adaptable to the logic of an integrated circuit chip to which the electro-optical chip 101 connects. In the example of FIG. 2, the flow of data from electronics-to-optics is from left-to-right, and the flow of data from optics-to-electronics is from right-to-left.

The electrical interface 201 is a block of circuitry configured to handle all electrical I/O to and from the integrated circuit chip to which the electro-optical chip 101 connects, such as an Ethernet switch chip/die, or other type of integrated circuit chip. The optical macros 205-1 to 205-N are responsible for conversion of data signals between the optical and electrical domains. Specifically, each of the optical macros 205-1 to 205-N is configured to convert electrical data signals received through the electrical interface 201 into optical data signals for transmission through the photonic interface 203. Also, each of the optical macros 205-1 to 205-N is configured to convert optical data signals received through the photonic interface 203 into electrical data signals for transmission through the electrical interface 201. The photonic interface 203 is responsible for coupling optical signals to and from the optical macros 205-1 to 205-N. The glue logic 207 enables flexible (dynamic or static) mapping of the electrical interface 201 to the optical macros 205-1 to 205-N and associated optical wavelengths. In this manner, the glue logic 207 (also called crossbar circuitry) provides dynamic routing of electrical signals between the optical macros 205-1 to 205-N and the electrical interface 201. The glue logic 207 also provides for retiming, rebuffering, and flit reorganization functions at the phy-level. Also, in some embodiments, the glue logic 207 implements various error correction and data-level link protocols to offload some processing from the integrated circuit chip to which the electro-optical chip 101 connects.

Figure 3:
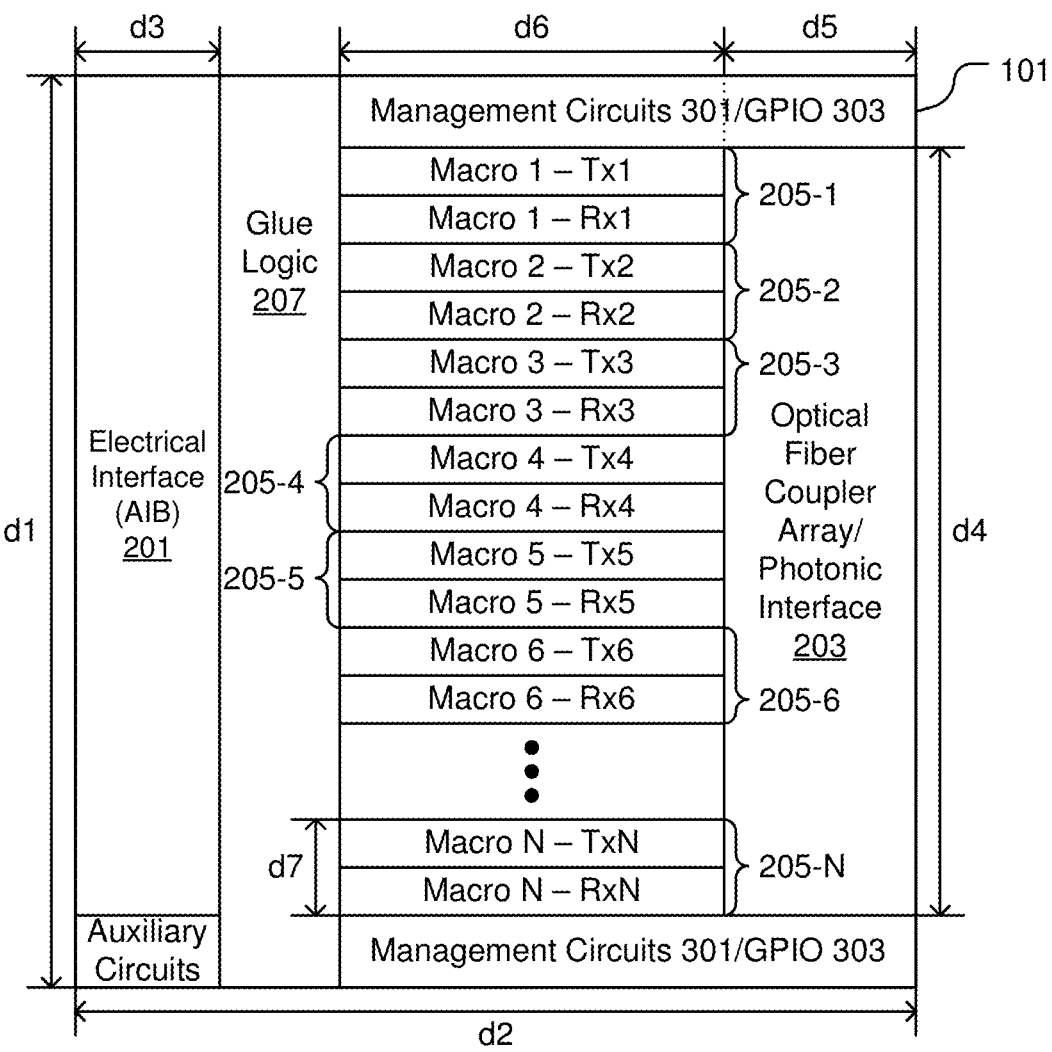
FIG. 3 shows an example layout of the electro-optical chip, in accordance with some embodiments.

FIG. 3 shows an example layout of the electro-optical chip 101, in accordance with some embodiments. The layout of the optical and electrical components of the electro-optical chip 101 is designed to optimize area efficiency, energy efficiency, performance, and practical considerations such as avoiding optical waveguide crossings. In some embodiments, the electrical interface 201 is laid out along one chip edge (left side edge in FIG. 3), and the photonic interface 203 for optical coupling with the optical fiber array is laid out along the opposite chip edge (right side edge in FIG. 3). In some embodiments, the photonic interface 203 includes an optical grating coupler for each of the optical fibers in the optical fiber array. In various embodiments, the photonic interface 203 includes vertical optical grating couplers, edge optical couplers, or essentially any other type of optical coupling device, or combination thereof to enable optical coupling of the optical fibers in the optical fiber array with the optical macros 205-1 to 205-N. In some embodiments, the photonic interface 203 is configured to interface with 24 optical fibers within the optical fiber array. In some embodiments, the photonic interface 203 is configured to interface with 16 optical fibers within the optical fiber array. However, in various embodiments, the photonic interface 203 can be configured to interface with essentially any number of optical fibers within the optical fiber array.

The glue logic 207 routes data between the electrical interface 201 and the optical macros 205-1 to 205-N. The glue logic 207 includes cross-bar switches and other circuitry as needed to interface the electrical interface 201 connections with the optical macros 205-1 to 205-N. In some embodiments, the optical transmitters (Tx) and optical receivers (Rx) of the optical macros 205-1 to 205-N are combined in pairs, with each Tx/Rx pair forming an optical transceiver. The glue logic 207 enables dynamic mapping of electrical lanes/channels to optical lanes/channels. The optical macros 205-1 to 205-N (for data transmitting (Tx) and data receiving (Rx)) are laid out in between the glue logic 207 and the photonic interface 203 that couples with the optical fibers of the optical fiber array. The optical macros 205-1 to 205-N include both optical and electrical circuitry responsible for converting electrical signals to optical signals and for converting optical signals to electrical signals.

In some embodiments, the electrical interface 201 is configured to implement the Advanced Interface Bus (AIB) protocol to enable electrical interface between the electro-optical chip 101 and one or more other integrated circuit chips. It should be understood, however, that in other embodiments the electrical interface 201 can be configured to implement essentially any electrical data communication interface other than AIB. For example, in some embodiments, the electrical interface 201 includes a High Bandwidth Memory (HBM) and Kandou Bus for serialization/deserialization of data.

In some embodiments, the electro-optical chip 101 has a length d1 and a width d2, where d1 is about 8.9 millimeters (mm) and d2 is about 5.5 mm. It should be understood that the term "about," as used herein, means+/−10% of a given value. In some embodiments, the length d1 is less than about 8.9 mm. In some embodiments, the length d1 is greater than about 8.9 mm. In some embodiments, the width d2 is less than about 5.5 mm. In some embodiments, the width d2 is greater than about 5.5 mm. In some embodiments, the electrical interface 201 has a width d3 of about 1.3 mm. In some embodiments, the width d3 is less than about 1.3 mm. In some embodiments, the width d3 is greater than about 1.3 mm. In some embodiments, the photonic interface 203 for the optical fiber array has a length d4 of about 5.2 mm and a width d5 of about 2.3 mm. In some embodiments, the length d4 is less than about 5.2 mm. In some embodiments, the length d4 is greater than about 5.2 mm. In some embodiments, the optical macros 205-1 to 205-N have a width d6 of about 1.8 mm. In some embodiments, the width d6 is less than about 1.8 mm. In some embodiments, the width d6 is greater than about 1.8 mm. In some embodiments, each transmitter Tx and receiver Rx optical macro 205-1 to 205-N pair has a length d7 of about 0.75 mm. In some embodiments, the length d7 is less than about 0.75 mm. In some embodiments, the length d7 is greater than about 0.75 mm. In some embodiments, the transmitter Tx and receiver Rx optical macros 205-1 to 205-N are positioned to align with an optical fiber pitch within the photonic interface 203. In some embodiments, the length d7 of each optical macro 205-1 to 205-N (pair of transmitter (Tx) and receiver (Rx) optical macros) is matched to the pitch of the optical fibers in a standard optical fiber ribbon. For example, if the optical fiber pitch is 250 micrometers, and three of the optical fibers in the optical fiber ribbon correspond to one optical macro 205-1 to 205-N (one optical fiber brings CW light to the transmitter (Tx) optical macro from a laser, one optical fiber carries modulated light from the transmitter (Tx) optical macro, and one optical fiber brings modulated light representing encoded data to the receiver (Rx) optical macro), then the optical macro length d7 is 750 micrometers.

In some embodiments, the number N of optical macros 205-1 to 205-N is 8. In some embodiments, the number N of optical macros 205-1 to 205-N is less than 8. In some embodiments, the number N of optical macros 205-1 to 205-N is greater than 8. Also, each of the optical macros 205-1 to 205-N represents at least one optical port. In some embodiments, a dual phase lock loop (PLL) circuit is shared by each transmitter Tx/receiver Rx pair within the optical macros 205-1 to 205-N. In some embodiments, the dual PLL includes a PLLU that covers a frequency range from 24 GigaHertz (GHz) to 32 GHz, and a PLLD that covers a frequency range from 15 GHz to 24 GHz.

The electro-optical chip 101 also includes management circuits 301 and general purpose input/output (GPIO) components 303 for communicating electrical data signals to and from the electro-optical chip 101. In various embodiments, the GPIO components 303 include Serial Peripheral Interface (SPI) components and/or another type of component to enable off-chip data communication. Also, in some embodiments, the electro-optical chip 101 includes many other circuits, such as memory (e.g., SRAM), a CPU, analog circuits, and/or any other circuit that is implementable in CMOS. In some embodiments, the electro-optical chip 101 has a coarse wavelength division multiplexing 4-lane (CWDM4) configuration in which each of the optical macros 205-1 to 205-N includes four serializer/deserializer (SerDes) slices (FR-4) or eight SerDes slices (FR-8). In some embodiments, the optical macros 205-1 to 205-N are divided into wavelength transmit (Tx)/receive (Rx) slices, with each Tx/Rx slice including fully integrated analog Tx/Rx front-ends, serialization/deserialization, clock-data-recovery, and microring resonator thermal tuning digital control. In some embodiments, the photonic components integrated in each Tx/Rx slice/optical macro 205-x optical port are based on microring resonators (such as modulators, filters, etc.). In some embodiments, the electro-optical chip 101 optically couples to the optical fiber of the optical fiber array through edge-coupled V-groove structures with embedded mode-converters.

Figure 4:
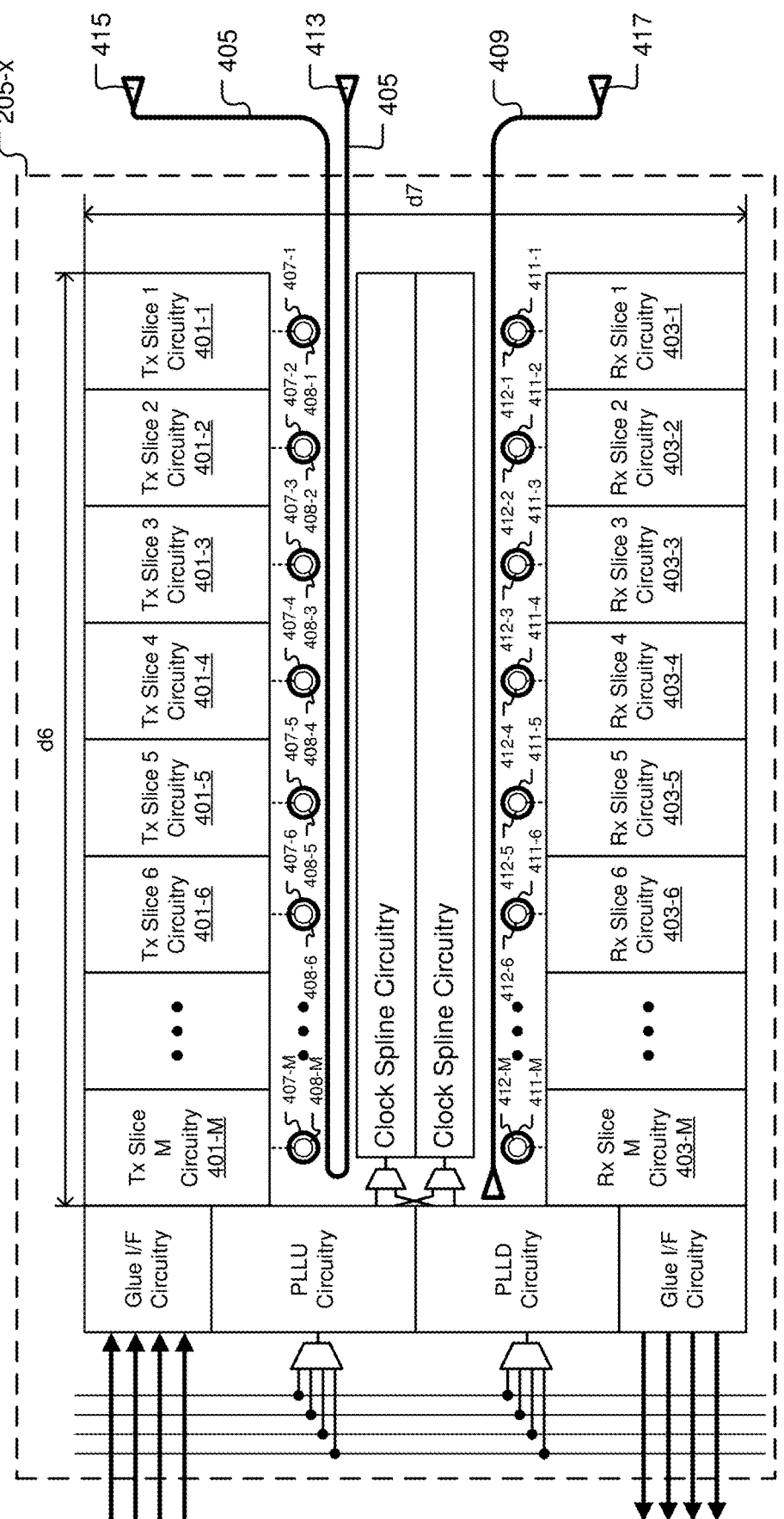
FIG. 4 shows an example layout of a given one of the optical macros, in accordance with some embodiments.

FIG. 4 shows an example layout of a given one of the optical macros 205-1 to 205-N, referred to as optical macro 205-x, in accordance with some embodiments. The optical macro 205-x includes a number M of transmit (Tx) slices 401-1 to 401-M and a number M of receive (Rx) slices 403-1 to 403-M. An optical slice of the optical macro 205-x refers to either a single one of the optical transmitter slices 401-1 to 401-M, or a single one of the optical receiver slices 403-1 to 403-M, or a combination of a single one of the optical transmitter slices 401-1 to 401-M and a corresponding single one of the optical receiver slices 403-1 to 403-M, where the single one of the optical transmitter slices 401-1 to 401-M and the single one of the optical receiver slices 403-1 to 403-M are controlled to operate on a single wavelength of light. The example layout of FIG. 4 shows the routing of an optical waveguide 405 and the placement of optical microring resonators 407-1 to 407-M within the transmit (Tx) portion of the optical macro 205-x. In some embodiments, the microring resonators 407-1 to 407-M function as modulators. The example layout of FIG. 4 also shows the routing of an optical waveguide 409 and the placement of optical microring resonators 411-1 to 411-M within the receive (Rx) portion of the optical macro 205-x. In some embodiments, the microring resonators 411-1 to 411-M function as photodetectors. In some embodiments, one or more of the microring resonators 407-1 to 407-M and 411-1 to 411-M are controlled to function as an optical multiplexer and/or as an optical demultiplexer.

Each corresponding pair of the transmit (Tx) slices 401-1 to 401-M and the receive (Rx) slices 403-1 to 403-M forms a Tx/Rx slice of the optical macro 205-x. For example, Tx Slice 1 401-1 and Rx Slice 1 403-1 together form a Slice 1 of the optical macro 205-x. The transmit (Tx) slices 401-1 to 401-M include electrical circuitry for directing translation of electrical data in the form of a bit stream into a stream of modulated light by operating the microring resonators 407-1 to 407-M to modulate the CW laser light at a given wavelength incoming through the optical waveguide 405 from an optical supply input 413 into a stream of modulated light at the given wavelength, with the stream of modulated light at the given wavelength being transmitted from the optical macro 205-x through the optical waveguide 405 to the optical signal output 415. In some embodiments, each of the transmit (Tx) slices 401-1 to 401-M includes electrical circuitry for inphase signal generation and/or quadrature signal generation, injection locked oscillator circuitry, and phase interpolator circuitry. The receive (Rx) slices 403-1 to 403-M include electrical circuitry for detecting light of a given wavelength within a stream of modulated light incoming through the optical waveguide 409 from an optical signal input 417 by operating the microring resonators 411-1 to 411-M. The electrical circuitry within the receive (Rx) slices 403-1 to 403-M translate the light that is detected by the microring resonators 411-1 to 411-M at a corresponding wavelength into a bit stream in the electrical domain. In some embodiments, each of the receive (Rx) slices 403-1 to 403-M includes electrical circuitry for inphase signal generation and/or quadrature signal generation (I/Q signal generation), injection locked oscillator (ILO) circuitry, phase interpolator (PI) circuitry, transimpedance amplifier (TIA) circuitry, and signal equalization (EQ) circuitry. In some embodiments, the receive (Rx) slices 403-1 to 403-M utilize a respective dummy microring photodetector (PD) for better matching in the receiver analog front-end and for robustness to common-mode noise (e.g., supply).

The optical waveguide 405 routes CW laser light from the optical supply input 413 to each of the microring resonators 407-1 to 407-M within the transmit (Tx) slices 401-1 to 401-M. The optical waveguide 405 also routes modulated light from the microring resonators 407-1 to 407-M within the transmit (Tx) slices 401-1 to 401-M to the optical signal output 415 for transmission out of the electro-optical chip 101. In some embodiments, each of the microring resonators 407-1 to 407-M within the transmit (Tx) slices 401-1 to 401-M is tunable to operate at a specified wavelength of light. Also, in some embodiments, the specified wavelength of light at which a given microring resonator 407-x is tuned to operate is different than the specified wavelengths at which the other microring resonators 407-1 to 407-M, excluding 407-x, are tuned to operate. In some embodiments, a corresponding heating device 408-1 to 408-M is positioned near each of the microring resonators 407-1 to 407-M to provide for thermal tuning of the resonant wavelength of the microring resonator. In some embodiments, a corresponding heating device 408-1 to 408-M is positioned within an inner region circumscribed by a given microring resonator 407-x to provide for thermal tuning of the resonant wavelength of the given microring resonator 407-x. In some embodiments, the heating device 408-1 to 408-M of each of the microring resonators 407-1 to 407-M is connected to corresponding electrical control circuitry within the corresponding transmit (Tx) slice that is operated to thermally tune the resonant wavelength of the microring resonator. In some embodiments, each of the microring resonators 407-1 to 407-M is connected to corresponding electrical tuning circuitry within the corresponding transmit (Tx) slice that is operated to electrically tune the resonant wavelength of the microring resonator. In various embodiments, each of the microring resonators 407-1 to 407-M operates as part of an optical modulator and/or optical multiplexer.

The optical waveguide 409 routes incoming modulated light from the optical signal input 417 to the microring resonators 411-1 to 411-M within the receive (Rx) slices 403-1 to 403-M. In some embodiments, each of the microring resonators 411-1 to 411-M within the receive (Rx) slices 403-1 to 403-M is tunable to operate at a specified wavelength of light. Also, in some embodiments, the specified wavelength of light at which a given microring resonator 411-x is tuned to operate is different than the specified wavelengths at which the other microring resonators 411-1 to 411-M, excluding 411-x, are tuned to operate. In some embodiments, a corresponding heating device 412-1 to 412-M is positioned near each of the microring resonators 411-1 to 411-M to provide for thermal tuning of the resonant wavelength of the microring resonator. In some embodiments, a corresponding heating device 412-1 to 412-M is positioned within an inner region circumscribed by a given microring resonator 411-x to provide for thermal tuning of the resonant wavelength of the given microring resonator 411-x. In some embodiments, the heating device 412-1 to 412-M of each of the microring resonators 411-1 to 411-M is connected to corresponding electrical control circuitry within the corresponding receive (Rx) slice that is operated to thermally tune the resonant wavelength of the microring resonator. In some embodiments, each of the microring resonators 411-1 to 411-M is connected to corresponding electrical tuning circuitry within the corresponding receive (Rx) slice that is operated to electrically tune the resonant wavelength of the microring resonator. In various embodiments, each of the microring resonators 411-1 to 411-M operates as part of a photodetector and/or optical demultiplexer.

In some embodiments, the architecture and floorplan of the optical macro 205-x is variable by including a different number of PLLs at various positions within the optical macro 205-x. For example, in some embodiments, a centralized PLL is positioned within the clock spine and fans out to the slices at both sides of the optical macro 205-x. In various embodiments, the PLL is replicated as multiple PLL instances across the optical macro 205-x, with each PLL instance either dedicated to a given transmit (Tx)/receive (Rx) slice or shared with a subset of transmit (Tx)/receive (Rx) slices. In various embodiments, other floorplan configurations of the optical macro 205-x include multiple columns of optical macros with pass-through photonic rows, to increase the edge bandwidth density, and/or staggering of the transmit (Tx) and receive (Rx) optical macros side-by-side to increase the edge bandwidth density.

The optical macro 205-x includes both photonic and electronic components. The optical waveguides 405 and 409 are laid out in the optical macro 205-x so as to avoid optical waveguide crossings and so as to minimize optical waveguide length, which minimizes optical losses, and correspondingly improves the energy efficiency of the system. The optical macro 205-x is laid out in such a way as to minimize the distance between the electronic components and the optical components in order to minimize electrical trace length, which improves the energy efficiency of the optical macro 205-x, enables faster signal transmission, and reduces chip size.

The electro-optical chip 101 includes the set of (N) optical macros 205-1 to 205-N. Each optical macro 205-x includes the set of (M) optical transmitter slices 401-1 to 401-M and optical receiver slices 403-1 to 403-M that are logically grouped together to transmit or receive bits on a number (W) of different optical wavelengths on the respective optical waveguide 405 and 409. In various embodiments, the number (M) of optical transmitter slices 401-1 to 401-M and optical receiver slices 403-1 to 403-M and the number (W) of different optical wavelengths can be defined as needed, considering that any number of optical transmitter slices 401-1 to 401-M and/or optical receiver slices 403-1 to 403-M is tunable to a given one of the number (W) of optical wavelengths. However, if data bits are being transmitted or received by multiple ones of the optical microring resonators 407-1 to 407-M, or by multiple ones of the optical microring resonators 411-1 to 411-M, tuned to the same optical wavelength, channel/wavelength contention is managed. The floorplan and organization of the optical macro 205-x represent adjustable degrees of freedom for controlling the following metrics: length of optical waveguides 405 and 409 (which directly correlates with optical loss); optical macro 205-x area (which correlates with manufacturing cost); energy consumed per bit (energy efficiency); electrical signaling integrity (which correlates with performance); electrical package escape (the amount of electrical data input and output that is physically available for a given set of chip dimensions and for a given spacing/pitch of electrical bumps); and optical package escape (the amount of optical data input and output that is physically available for a given set of chip dimensions and for a given spacing/pitch of optical fibers).

Figure 5A:
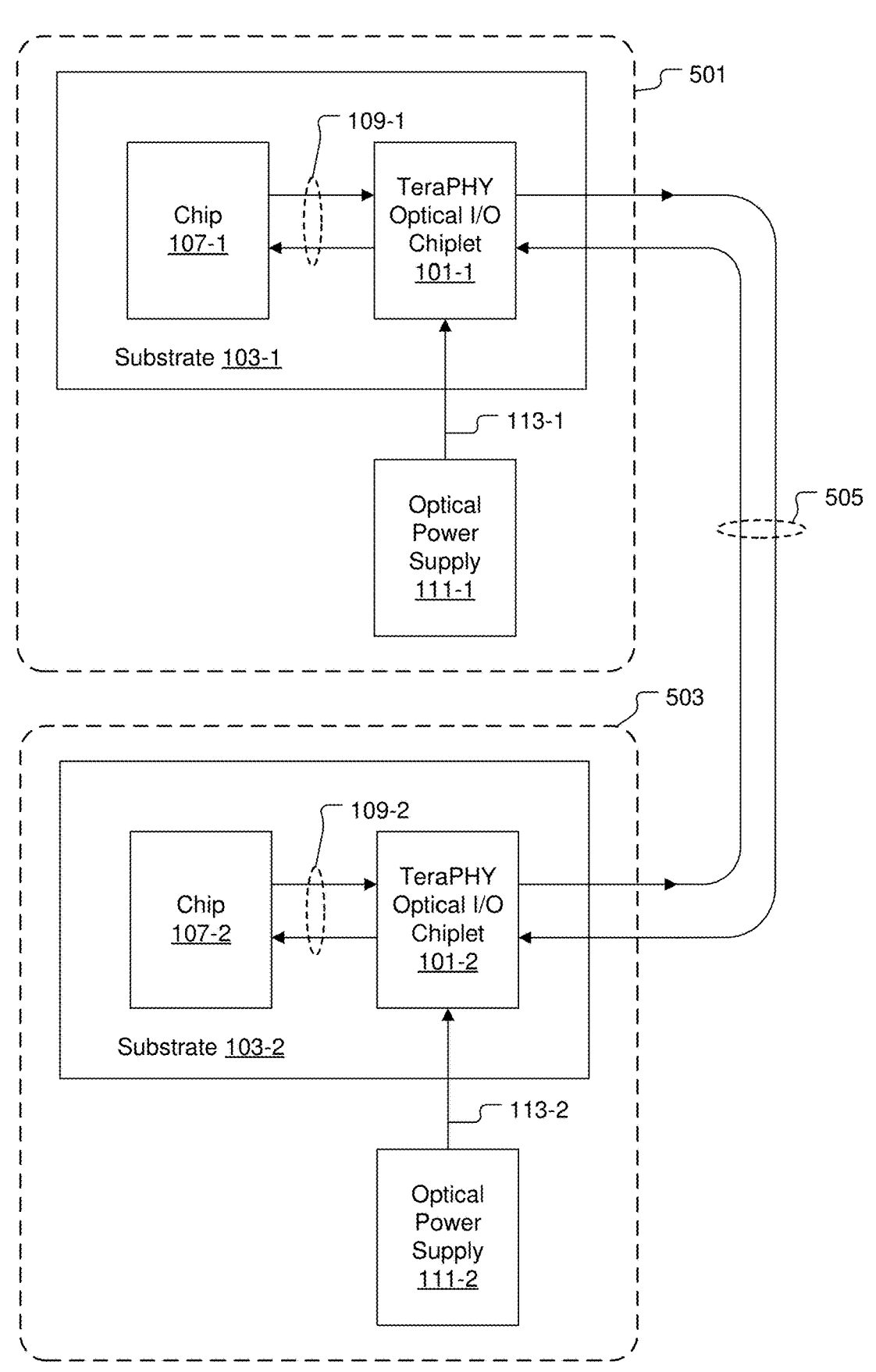
FIG. 5A shows a diagram of a first computer system optically connected to a second computer system through an optical link, in accordance with some embodiments.

FIG. 5A shows a diagram of a first computer system 501 optically connected to a second computer system 503 through an optical link 505, in accordance with some embodiments. In various embodiments, the first computer system 501 represents essentially any packaged set of semiconductor chips that includes at least one integrated circuit chip 107-1 electrically connected to at least one electro-optical chip 101-1, as indicated by electrical connections/routings 109-1. In some embodiments, the at least one integrated circuit chip 107-1 and the at least one electro-optical chip 101-1 are packaged on a common substrate 103-1. The at least one electro-optical chip 101-1 is connected to receive optical power from an optical power supply 111-1 through one or more optical waveguides 113-1, such as an optical fiber array. The at least one electro-optical chip 101-1 corresponds to the electro-optical chip 101 discussed herein. In some embodiments, the optical power supply 111-1 is the same as the optical power supply 111 described with regard to FIG. 1A.

In various embodiments, the second computer system 503 represents essentially any packaged set of semiconductor chips that includes at least one integrated circuit chip 107-2 electrically connected to at least one electro-optical chip 101-2, as indicated by electrical connections/routings 109-2. In some embodiments, the at least one integrated circuit chip 107-2 and the at least one electro-optical chip 101-2 are packaged on a common substrate 103-2. The at least one electro-optical chip 101-2 is connected to receive optical power from an optical power supply 111-2 through one or more optical waveguides 113-2, such an optical fiber array. The at least one electro-optical chip 101-2 corresponds to the electro-optical chip 101 discussed herein. In some embodiments, the optical power supply 111-2 is the same as the optical power supply 111 described with regard to FIG. 1A. Also, in some embodiments, the optical power supplies 111-1 and 111-2 are the same optical power supply. The electro-optical chip 101-1 of the first computer system 501 is optically connected to the electro-optical chip 101-2 of the second computer system 503 through the optical link 505. In some embodiments, the optical link 505 is an optical fiber array.

Figure 5B:
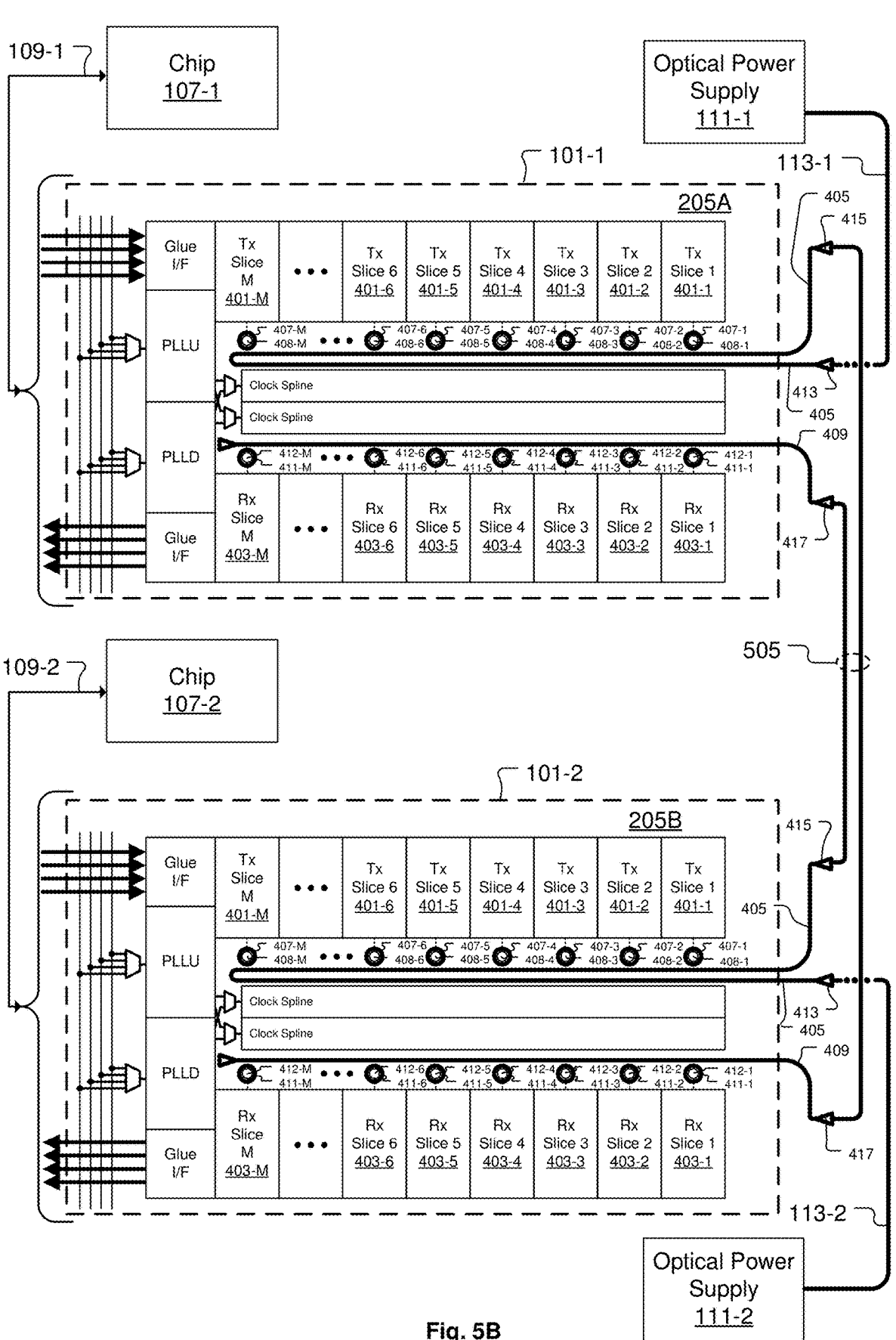
FIG. 5B shows a more detailed view of the optical connections between the electro-optical chip of the first computer system and the electro-optical chip of the second computer system, in accordance with some embodiments.

FIG. 5B shows a more detailed view of the optical connections between the electro-optical chip 101-1 of the first computer system 501 and the electro-optical chip 101-2 of the second computer system 503, in accordance with some embodiments. In some embodiments, each of the electro-optical chip 101-1 and 101-2 is configured in the same manner as electro-optical chip 101 described herein. The electro-optical chip 101-1 includes at least one optical macro 205A. The electro-optical chip 101-2 includes at least one optical macro 205B. Each of the optical macros 205A and 205B is configured in the same manner as the optical macro 205-x described herein.

The optical supply input 413 of the optical macro 205A is optically connected to the optical power supply 111-1 through one or more optical waveguides 113-1. The optical signal output 415 of the optical macro 205A is optically connected to the optical signal input 417 of the optical macro 205B. In this manner, modulated optical signals generated by the transmitter slices 401-1 through 401-M of the optical macro 205A are transmitted to the receiver slices 403-1 through 403-M of the optical macro 205B. In some embodiments, the modulated optical signals generated by the transmitter slices 401-1 through 401-M convey data received by the optical macro 205A from the integrated circuit chip 107-1 in the form of electrical signals. The modulated optical signals that convey the data are optically coupled into the optical microring resonators 411-1 through 411-M of the optical macro 205B and are de-modulated by the receiver slices 403-1 through 403-M of the optical macro 205B into electrical signals that are transmitted to the integrated circuit chip 107-2 through the electrical connections/routings 109-2.

The optical supply input 413 of the optical macro 205B is optically connected to the optical power supply 111-2 through one or more optical waveguides 113-2. The optical signal output 415 of the optical macro 205B is optically connected to the optical signal input 417 of the optical macro 205A. In this manner, modulated optical signals generated by the transmitter slices 401-1 through 401-M of the optical macro 205B are transmitted to the receiver slices 403-1 through 403-M of the optical macro 205A. In some embodiments, the modulated optical signals generated by the transmitter slices 401-1 through 401-M of the optical macro 205B convey data provided by the integrated circuit chip 107-2 through the electrical connections/routings 109-2 to the optical macro 205B. The modulated optical signals that convey the data provided by the integrated circuit chip 107-2 are optically coupled into the optical microring resonators 411-1 through 411-M of the optical macro 205A and are de-modulated by the receiver slices 403-1 through 403-M of the optical macro 205A into electrical signals that are transmitted to chip 107-1 through the electrical connections/routings 109-1.

The electro-optical chip 101 has a small footprint because the intellectual property (IP) building blocks on the chiplet are dense. These IP building blocks include the optical microring resonators, which are used for multiplexing and demultiplexing multiple wavelengths of light onto optical waveguides, as well as modulating light and functioning as photodetectors, in a very small chip area. In some embodiments, each of the optical microring resonators of the electro-optical chip 101 has an outer diameter of less than 10 micrometers. The IP building blocks on the chip are also dense because the electrical circuitry that controls the optical devices is closely integrated on the same chip with the optical devices that they control, making it possible to optimize space efficiency.

Figures 6A, 6B:
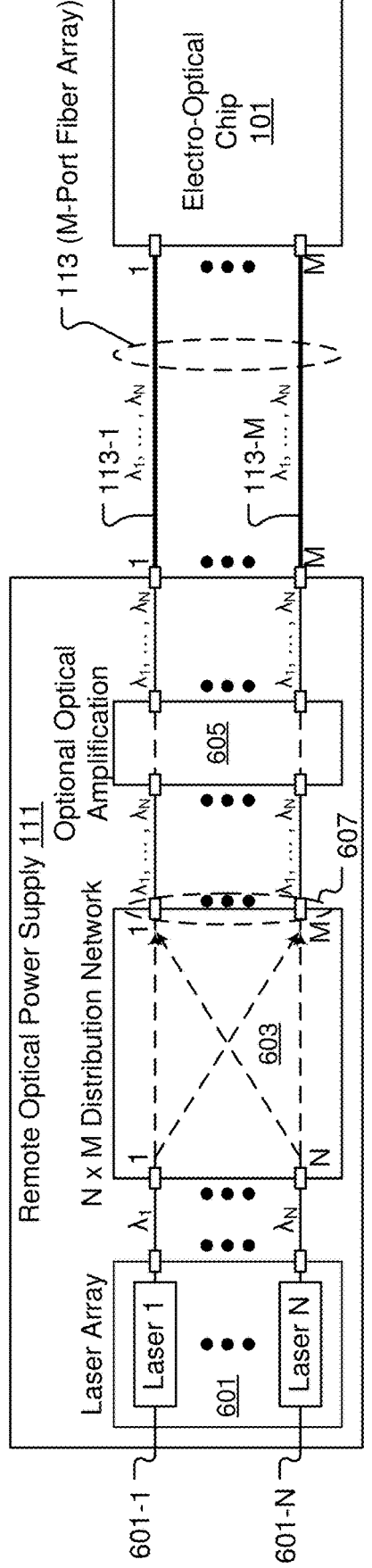
FIG. 6A shows an example implementation of a remote optical power supply for an optical data communication system, in accordance with some embodiments.
FIG. 6B shows a diagram indicating how each of the optical fibers of the M-port optical fiber array receives each of the multiple wavelengths ($\lambda_1$ to $\lambda_N$) of continuous wave laser light from the remote optical power supply, in accordance with some embodiments.

FIG. 6A shows an example implementation of a remote optical power supply 111A for an optical data communication system, in accordance with some embodiments. The remote optical power supply 111A includes a laser array 601, an N×M optical distribution network 603, and an optional optical amplification module 605. The laser array 601 includes a number (N) of lasers 601-1 to 601-N, where N is greater than one. Each laser 601-1 to 601-N is configured to generate and output CW laser light of a different wavelength $\lambda_1$ to $\lambda$N, respectively. The optical distribution network 603 routes the laser light at each of the N wavelengths, as generated by the multiple laser elements 601-1 through 601-N, to each of a number (M) of optical output ports 607 of the optical distribution network 603. In some embodiments, the optional optical amplification module 605 is not present and the multiple wavelengths ($\lambda_1$ to $\lambda_N$) of CW laser light that are directed to a given one of the (M) optical output ports 607 of the optical distribution network 603 are transmitted directly into a corresponding one of the optical fibers 113-1 to 113-M of an M-port optical fiber array 113. In some embodiments, the optional optical amplification module 605 is present and the multiple wavelengths ($\lambda_1$ to $\lambda_N$) of CW laser light that are directed to a given one of the (M) optical output ports 607 of the optical distribution network 603 are transmitted through the optical amplification module 605 for amplification in route to a corresponding one of the optical fibers 113-1 to 113-M of the M-port optical fiber array 113. In this manner, the remote optical power supply 111 operates to provide multiple wavelengths ($\lambda_1$ to $\lambda_N$) of CW laser light on each of the multiple optical fibers 113-1 to 113-M of the M-port optical fiber array 113. In some embodiments, each of the optical fibers 113-1 to 113-M of the M-port optical fiber array 113 is connected to route the multiple wavelengths ($\lambda_1$ to $\lambda_N$) of CW laser light that it receives from the remote optical power supply 111 to a corresponding optical supply port on the electro-optical chip 101, such as to the optical supply inputs 413 corresponding to the transmit macros on the electro-optical chip 101 as described with regard to FIG. 4. FIG. 6B shows a diagram indicating how each of the optical fibers 113-1 to 113-M of the M-port optical fiber array 113 receives each of the multiple wavelengths ($\lambda_1$ to $\lambda_N$) of CW laser light from the remote optical power supply 111, in accordance with some embodiments. In some embodiments, each of the multiple wavelengths ($\lambda_1$ to $\lambda_N$) of CW laser light is output from the remote optical power supply 111 at a substantially equal intensity (power). However, in some embodiments, the optical power level of one or more of the multiple wavelengths ($\lambda_1$ to $\lambda_N$) of CW laser light as output from the remote optical power supply 111 is different than the optical power levels of others of the multiple wavelengths ($\lambda_1$ to $\lambda_N$) of CW laser light as output from the remote optical power supply 111.

Figure 6C:
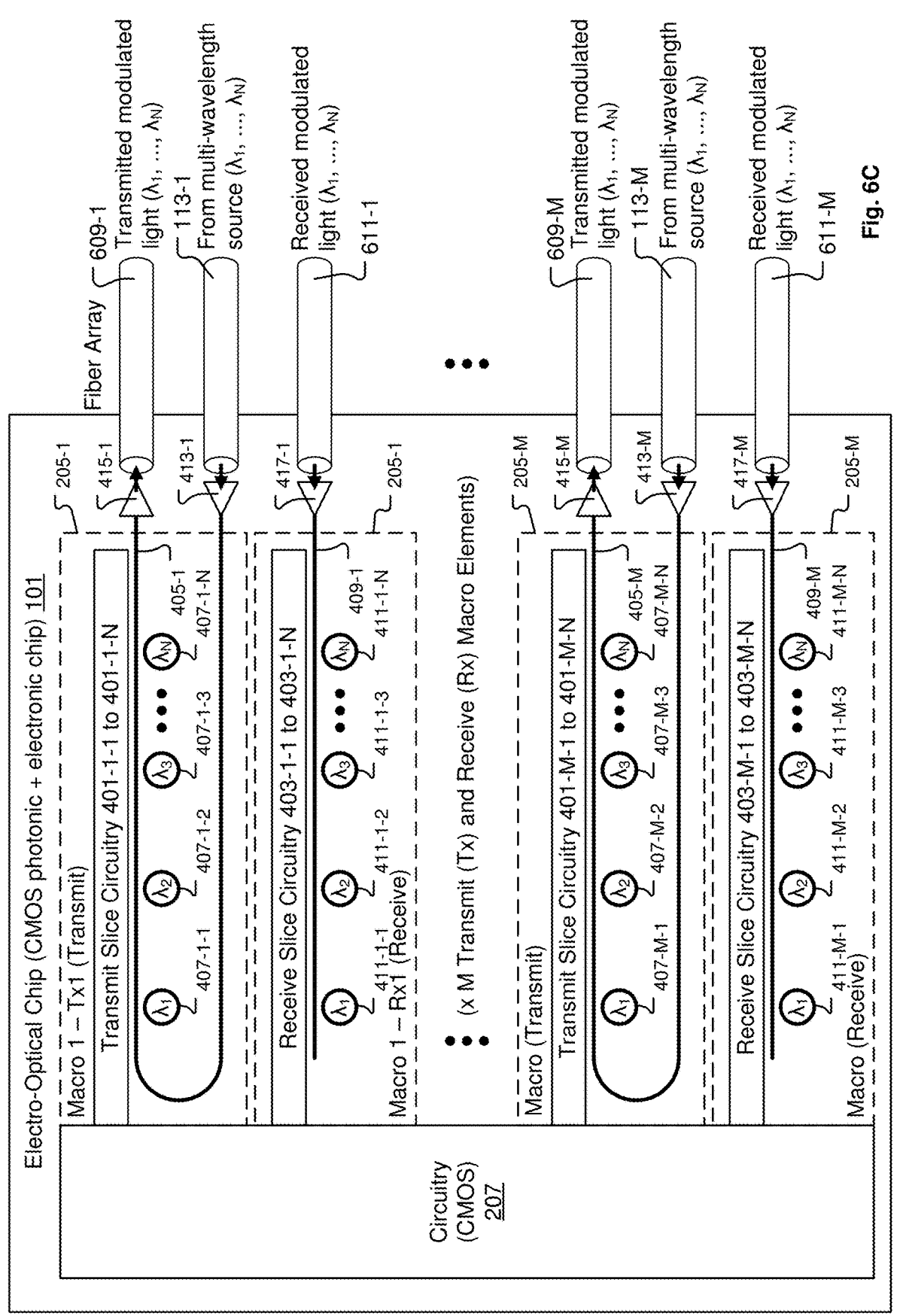
FIG. 6C shows an example diagram of the electro-optical chip connected to the M-port optical fiber array that includes optical fibers, in accordance with some embodiments.

FIG. 6C shows an example diagram of the electro-optical chip 101 connected to the M-port optical fiber array 113 that includes optical fibers 113-1 to 113-M, in accordance with some embodiments. The electro-optical chip 101 includes the number (M) of transmit/receive macros 205-1 to 205-M. Each transmit/receive macro 205-1 to 205-M includes a transmit macro having the microring resonators 407-x-1 to 407-x-M and corresponding transmit slice circuitry 401-x-1 to 401-x-N, where x identifies the particular one of the M transmit/receive macros 205-1 to 205-M. Each transmit/receive macro 205-1 to 205-M also includes a receive macro having the microring resonators 411-x-1 to 411-x-M and corresponding receive slice circuitry 403-x-1 to 403-x-N, where x identifies the particular one of the M transmit/receive macros 205-1 to 205-M. Each transmit/receive macro 205-1 to 205-M includes an optical supply input 413-1 to 413-M, respectively, that is connected to a corresponding one of the optical fibers 113-1 to 113-M, respectively, to receive the multi-wavelength ($\lambda_1$ to $\lambda_N$) CW laser light from the remote optical power supply 111. In some embodiments, the number (M) of optical fibers 113-1 to 113-M required from the remote optical power supply 111 equals the number of transmit/receive macros 205-1 to 205-M of the electro-optical chip 101.

The optical supply inputs 413-1 to 413-M are connected to optical waveguides 405-1 to 405-M, respectively. Each of the optical waveguides 405-1 to 405-M extends past the number (N) of microring resonators 407-x-1 to 407-x-N, where x identifies the particular one of the M transmit/receive macros 205-1 to 205-M, so as to enable evanescent coupling of light between the optical waveguides 405-1 to 405-M and the corresponding set of microring resonators 407-x-1 to 407-x-N. Each of the microring resonators 407-x-1 to 407-x-N is operated as an optical ring modulator tuned to a corresponding one of the N wavelengths ($\lambda_1$ to $\lambda_N$) of the incoming CW laser light. Each of the microring resonators 407-x-1 to 407-x-N is controlled by the corresponding transmit slice circuitry 401-x-1 to 401-x-N to function as an optical ring modulator to modulate the incoming CW laser light of a particular wavelength $\lambda_y$, where y is in the set of 1 to N) on the corresponding optical waveguide 405-1 to 405-M in accordance with electrical signals that represent digital data, so as to generate modulated light of the corresponding wavelength ($\lambda_y$) that has a modulation pattern that conveys the digital data represented by the electrical signals. After extending past each of the microring resonators 407-x-1 to 407-x-N, each of the optical waveguides 405-1 to 405-M extends to a respective optical signal output 415-1 to 415-M. The modulated light is transmitted from the optical signal outputs 415-1 to 415-M into respective optical fibers 609-1 to 609-M that carry the modulated light to a destination somewhere within the optical data communication system.

Each receive macro of the transmit/receive macros 205-1 to 205-M includes an optical signal input 417-1 to 417-M, respectively, that is connected to a corresponding one of optical fibers 611-1 to 611-M, respectively, to receive modulated light of various wavelengths from other devices within the optical data communication system. The optical signal inputs 417-1 to 417-M are connected to optical waveguides 409-1 to 409-M, respectively. Each of the optical waveguides 409-1 to 409-M extends past the number (N) of microring resonators 411-x-1 to 411-x-N, where x identifies the particular one of the M transmit/receive macros 205-1 to 205-M, so as to enable evanescent coupling of light between the optical waveguides 409-1 to 409-M and the corresponding set of microring resonators 411-x-1 to 411-x-N. In some embodiments, each of the microring resonators 411-x-1 to 411-x-N is operated as an optical ring detector (photodetector) tuned to a corresponding one of the N wavelengths ($\lambda_1$ to $\lambda_N$) of the incoming modulated light. In some embodiments, each of the microring resonators 411-x-1 to 411-x-N is controlled by the corresponding receive slice circuitry 403-x-1 to 403-x-N to function as an optical ring detector (photodetector) to detect the incoming modulated light of a particular wavelength ($\lambda_y$, where y is in the set of 1 to N) on the corresponding optical waveguide 409-1 to 409-M. The microring resonators 411-x-1 to 411-x-N in conjunction with the corresponding receive slice circuitry 403-x-1 to 403-x-N functions to convert the incoming modulated light signals into corresponding electrical signals in accordance with the modulation pattern of the incoming light. The resulting electrical signals are processed by receive slice circuitry 403-x-1 to 403-x-N to recreate the digital data upon which the incoming modulated light was modulated.

Figure 7A:
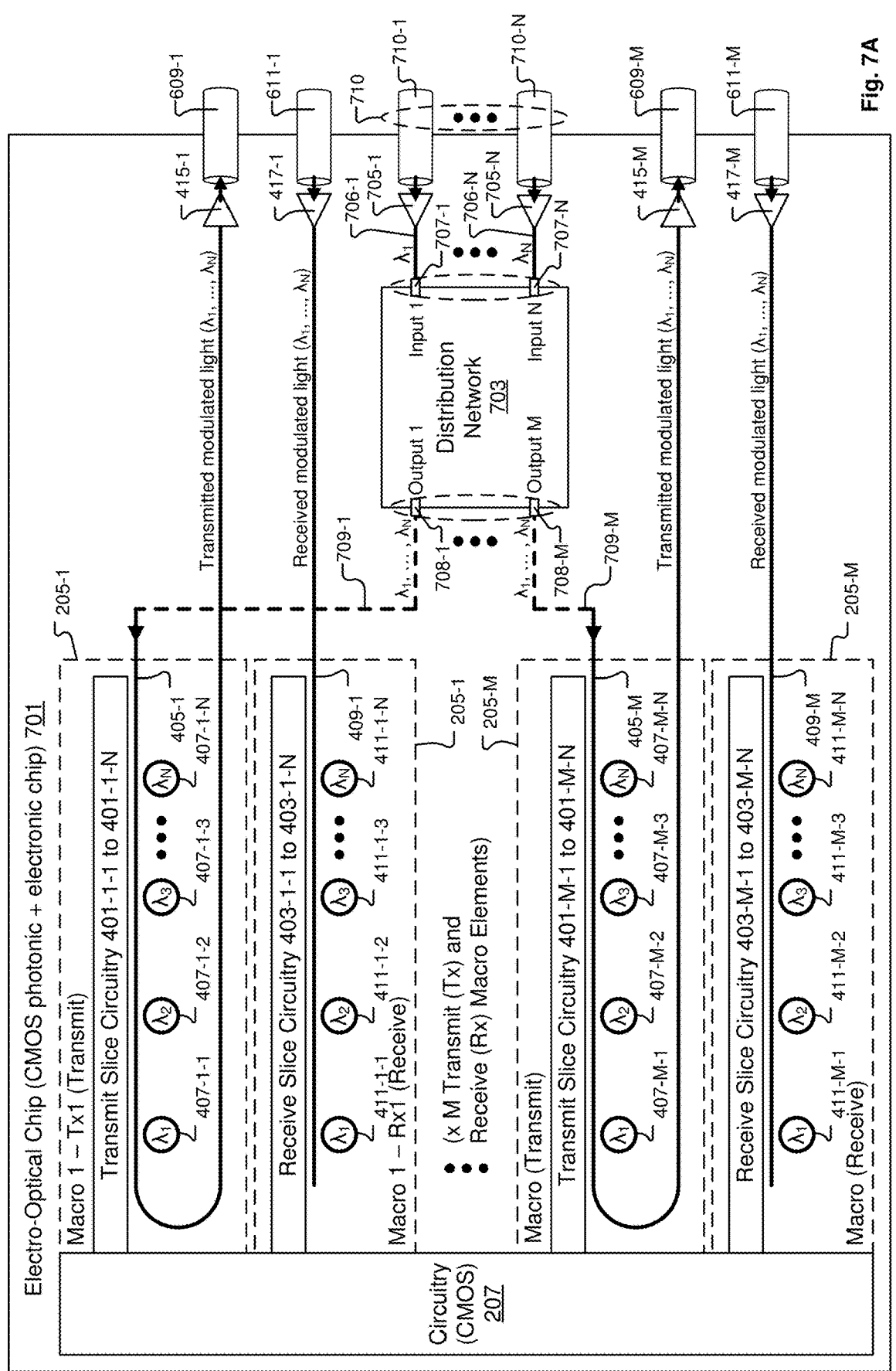
FIG. 7A shows an example diagram of an electro-optical chip that implements an N×M optical distribution network onboard the electro-optical chip, in accordance with some embodiments.

FIG. 7A shows an example diagram of an electro-optical chip 701 that implements an N×M optical distribution network 703 onboard the electro-optical chip 701, in accordance with some embodiments. The electro-optical chip 701 includes the M transmit/receive optical macros 205-1 to 205-M as previously described with regard to the electro-optical chip 101 of FIG. 6C. The electro-optical chip 701 also includes the glue logic 207 and electrical interface 201 as previously described with regard to the electro-optical chip 101. The electro-optical chip 701 also includes a photonic interface similar to the photonic interface 203 as previously described with regard to the electro-optical chip 101. In some embodiments, the electro-optical chip 701 is a modification of the TeraPHY™ chip produced by Ayar Labs, Inc., as referenced above.

The N×M optical distribution network 703 includes N optical inputs 707-1 to 707-N respectively optically connected to receive CW light from the N optical fibers 710-1 to 710-N of the optical fiber array 710. In some embodiments, the N optical inputs 707-1 to 707-N of the N×M optical distribution network 703 are respectively optically connected to N optical supply input ports 705-1 to 705-N of the electro-optical chip 701, by way of N respective optical waveguides 706-1 to 706-N formed within the electro-optical chip 701. In some embodiments, the optical fibers 710-1 to 710-N convey different wavelengths of CW light, with each of the optical fibers 710-1 to 710-N conveying one wavelength of CW light. In some embodiments, the N×M optical distribution network 703 routes the CW laser light at each of the N wavelengths ($\lambda_1$ to $\lambda_N$), as received at the N optical inputs 707-1 to 707-N, to each of M on-chip optical outputs 708-1 to 708-M of the N×M optical distribution network 703. In this manner, the N×M optical distribution network 703 multiplexes the CW light received at the N optical inputs 707-1 to 707-N to each of the M optical outputs 708-1 to 708-M, such that each of the N wavelengths ($\lambda_1$ to $\lambda_N$) of CW light is transmitted to each one of the M on-chip optical outputs 708-1 to 708-M. In some embodiments, the N×M optical distribution network 703 routes the CW laser light of a subset of the N wavelengths (subset of $\lambda_1$ to $\lambda_N$), as received at the N optical inputs 707-1 to 707-N, to one or more of the M on-chip optical outputs 708-1 to 708-M of the N×M optical distribution network 703. In these embodiments, the subset of the N wavelengths (subset of $\lambda_1$ to $\lambda_N$) can be any one or more of the N wavelengths ($\lambda_1$ to $\lambda_N$), and may or may not be in sequential order with regard to wavelength magnitude. Also, in these embodiments, the N×M optical distribution network 703 can be configured to route different subsets of the N wavelengths (different subsets of $\lambda_1$ to $\lambda_N$), as received at the N optical inputs 707-1 to 707-N, to different ones of the M on-chip optical outputs 708-1 to 708-M of the N×M optical distribution network 703. In some embodiments, each of the M optical outputs 708-1 to 708-M is optically connected to a respective one of the M transmit/receive optical macros 205-1 to 205-M. For example, in some embodiments, M optical waveguides 709-1 to 709-M are formed within the electro-optical chip 701 to convey the N wavelengths ($\lambda_1$ to $\lambda_N$) (or a subset of the N wavelengths ($\lambda_1$ to $\lambda_N$)) of CW light from the M optical outputs 708-1 to 708-M, respectively, to the M optical waveguides 405-1 to 405-M, respectively, of the M transmit/receive optical macros 205-1 to 205-M. In some embodiments, the optical distribution network 703 is a passive photonic device formed within the electro-optical chip 701.

Figures 7B, 7C:
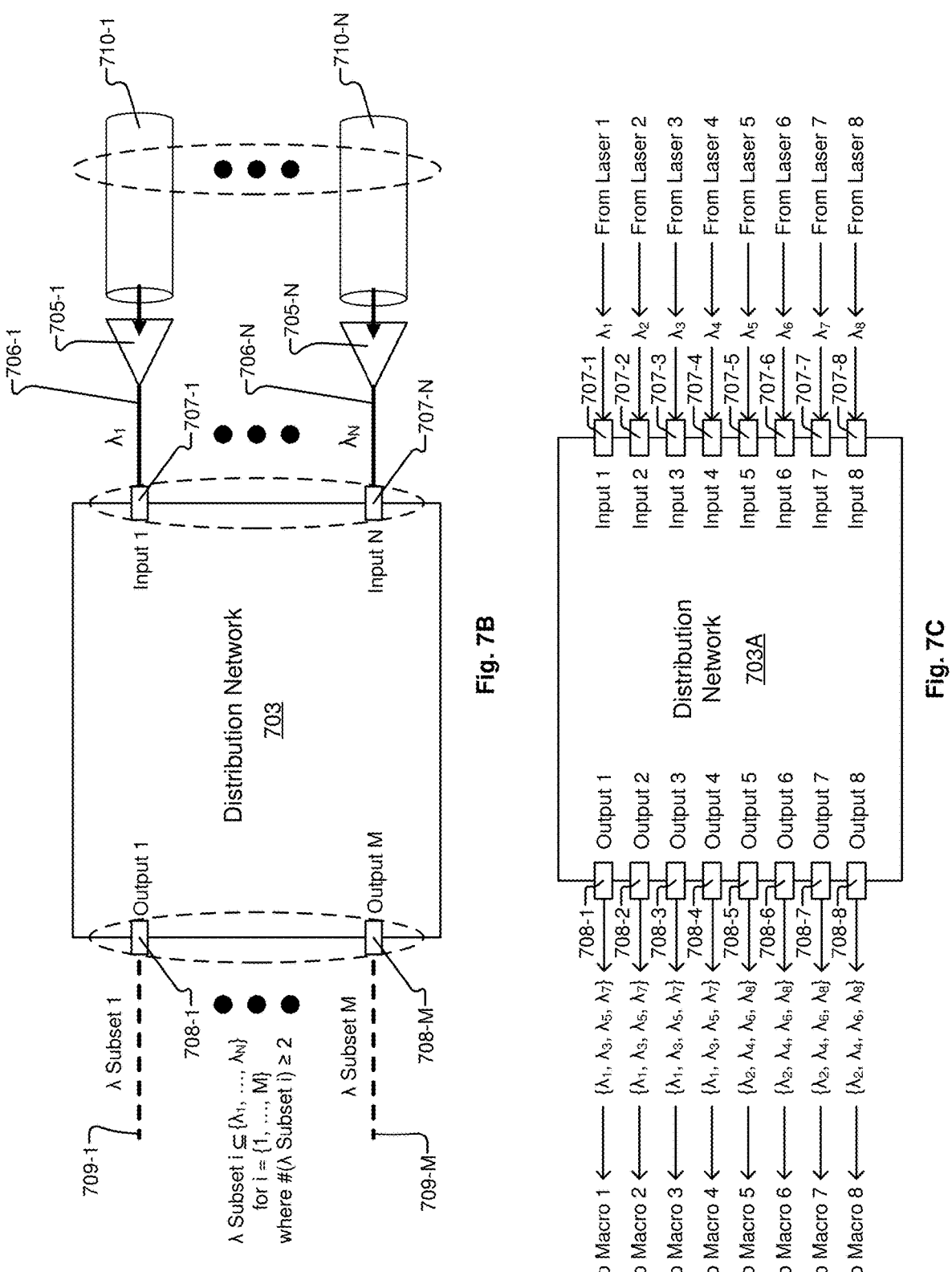
FIG. 7B shows an example diagram of the optical distribution network that is configured to convey a subset of the N wavelengths ($\lambda_1$ to $\lambda_N$) of CW light to each of one or more of the M optical outputs, in accordance with some embodiments.
FIG. 7C shows an example diagram of the optical distribution network that is configured to implement two 4×4 optical multiplexing functions, where N=8 and M=8, in accordance with some embodiments.

FIG. 7B shows an example diagram of the optical distribution network 703 that is configured to convey a subset of the N wavelengths ($\lambda_1$ to $\lambda_N$) of CW light to each of one or more of the M optical outputs 708-1 to 708-M, in accordance with some embodiments. In various embodiments, the optical distribution network 703 is configured so that at least two different subsets of the N wavelengths ($\lambda_1$ to $\lambda_N$) of CW light are conveyed to various ones of the M optical outputs 708-1 to 708-M. In some embodiment, the optical distribution network 703 is configured to convey different ones of the N wavelengths ($\lambda_1$ to $\lambda_N$) of CW light received at the N optical inputs 707-1 to 707-N to different ones of the M optical outputs 708-1 to 708-M. In some embodiments, the optical distribution network 703 is configured to convey a set of two or more of the N optical inputs 707-1 to 707-N to each of the M optical outputs 708-1 to 708-M. In some embodiments, the optical distribution network 703 is configured to convey a set of two or more of the N optical inputs 707-1 to 707-N to a set of two or more of the M optical outputs 708-1 to 708-M. It should be understood that in various embodiments, the optical distribution network 703 is configured to convey any specified subset of the N optical inputs 707-1 to 707-N to any one or more specified ones of the M optical outputs 708-1 to 708-M. In some embodiments, the optical distribution network 703 is implemented in a static configuration in which the conveyance of any specified subset of the N optical inputs 707-1 to 707-N to any one or more specified ones of the M optical outputs 708-1 to 708-M is fixed during fabrication of the optical distribution network 703. In some embodiments, the optical distribution network 703 is implemented in a dynamic configuration in which the conveyance of any specified subset of the N optical inputs 707-1 to 707-N to any one or more specified ones of the M optical outputs 708-1 to 708-M is configurable after fabrication of the optical distribution network 703 and/or during operation of the electro-optical chip 701.

FIG. 7C shows an example diagram of the optical distribution network 703A that is configured to implement two 4×4 optical multiplexing functions, where N=8 and M=8, in accordance with some embodiments. The optical distribution network 703A is optically connected to receive eight different wavelengths of ($\lambda_1$ to $\lambda_8$) of CW light received at the eight optical inputs 707-1 to 707-8. The optical distribution network 703A is configured to convey a first subset of four wavelengths {$\lambda_1$, $\lambda_3$, $\lambda_5$, $\lambda_7$} of the eight different wavelengths of ($\lambda_1$ to $\lambda_8$) of CW light received at the eight optical inputs 707-1 to 707-8 to a first subset of four optical outputs {708-1, 708-2, 708-3, 708-4} of the eight optical outputs 708-1 to 708-8. The optical distribution network 703A is also configured to convey a second subset of four wavelengths {$\lambda_2$, $\lambda_4$, $\lambda_6$, $\lambda_8$} of the eight different wavelengths of ($\lambda_1$ to $\lambda_8$) of CW light received at the eight optical inputs 707-1 to 707-8 to a second subset of four optical outputs {708-5, 708-6, 708-7, 708-8} of the eight optical outputs 708-1 to 708-8. It should be understood that the configuration of the optical distribution network 703A is provided by way of example. In other embodiments, the optical distribution network 703 is configurable to convey light received at any specified subset of the N optical inputs 707-1 to 707-N to any specified subset of the M optical outputs 708-1 to 708-M.

Figure 8A:
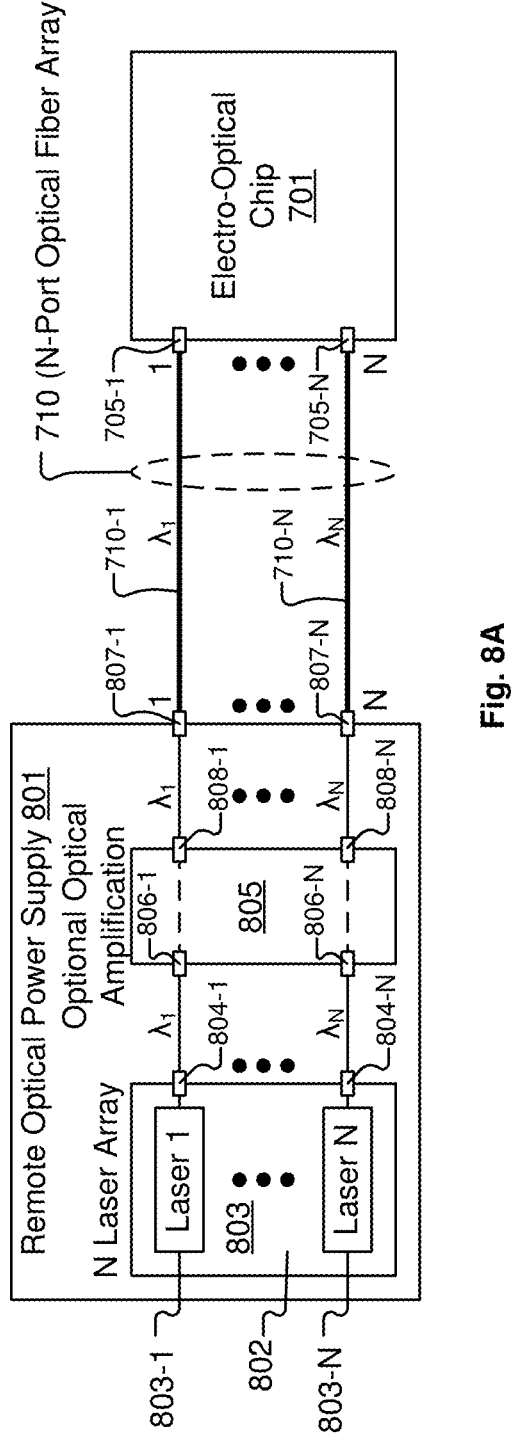
FIG. 8A shows a high-bandwidth, multi-wavelength WDM optical data communication system, in accordance with some embodiments.

FIG. 8A shows a high-bandwidth, multi-wavelength WDM optical data communication system 800, in accordance with some embodiments. The system 800 includes a remote (external to the electro-optical chip 701) optical power supply 801 configured to supply CW laser light at each of N wavelengths ($\lambda_1$ to $\lambda_N$), in accordance with some embodiments. The remote optical power supply 801 includes a laser array 803 that includes N lasers 803-1 to 803-N, where each of the N lasers 803-1 to 803-N is configured to generate CW laser light at a different wavelength ($\lambda_x$, where x is one of 1 to N) relative to the others of the N lasers 803-1 to 803-N. In some embodiments, each of the lasers 803-1 to 803-N is a distributed feedback (DFB) laser. In some embodiments, at least one of the N lasers 803-1 to 803-N is thermally coupled to at least one other of the N lasers 801-1 to 803-N, such that a change in temperature of one of the thermally coupled lasers results in a change in temperature of the other one of the thermally coupled lasers. In some embodiments, the N lasers 803-1 to 803-N are thermally coupled together in a collective manner, such that the respective temperatures of the N lasers 803-1 to 803-N change/drift together. In some embodiments, each of the N lasers 803-1 to 803-N is thermally connected to a common thermally conductive substrate/plate 802, such that the temperature of each of the N lasers 803-1 to 803-N is normalized to an average temperature based on the collective thermal output of the N lasers 803-1 to 803-N, and such that temperatures of the N lasers 803-1 to 803-N drift together in direction and magnitude.

In some embodiments, optical outputs 804-1 to 804-N of the N lasers 803-1 to 803-N are optically connected in a direct manner to respective ones of N optical outputs 807-1 to 807-N of the remote optical power supply 801. In some embodiments, as an option, the remote optical power supply 801 includes an optical amplification device 805 connected between the laser array 803 and the N optical outputs 807-1 to 807-N of the remote optical power supply 801. The optical amplification device 805 has N optical inputs 806-1 to 806-N and N optical outputs 808-1 to 808-N. The optical amplification device 805 is configured to amplify the optical signals (increase the optical power of the light) received from each of the N lasers 803-1 to 803-N, such that amplified versions of the CW laser light received at the optical inputs 806-1 to 806-N of the optical amplifying device 805 are transmitted through the corresponding optical outputs 808-1 to 808-N of the optical amplification device 805. In this manner, the CW laser light output from a given one of the optical outputs 808-1 to 808-N of the optical amplification device 805 is an amplified version of the CW laser light output by a corresponding one of the N lasers 803-1 to 803-N. Each of the N optical outputs 808-1 to 808-N of the optical amplification device 805 is optically connected to a corresponding one of the N optical outputs 807-1 to 807-N of the remote optical power supply 801, such that the amplified versions of the N wavelengths ($\lambda_1$ to $\lambda_N$) of CW laser light are respectively output from the N optical outputs 807-1 to 807-N of the remote optical power supply 801. The N optical outputs 807-1 to 807-N of the remote optical power supply 801 are respectively optically connected to the optical fibers 710-1 to 710-N of the optical fiber array 710. In this manner, each of the optical fibers 710-1 to 710-N conveys a different one of the N wavelengths ($\lambda_1$ to $\lambda_N$) of CW laser light from the remote optical power supply 801 to the electro-optical chip 701.

Figure 8B:
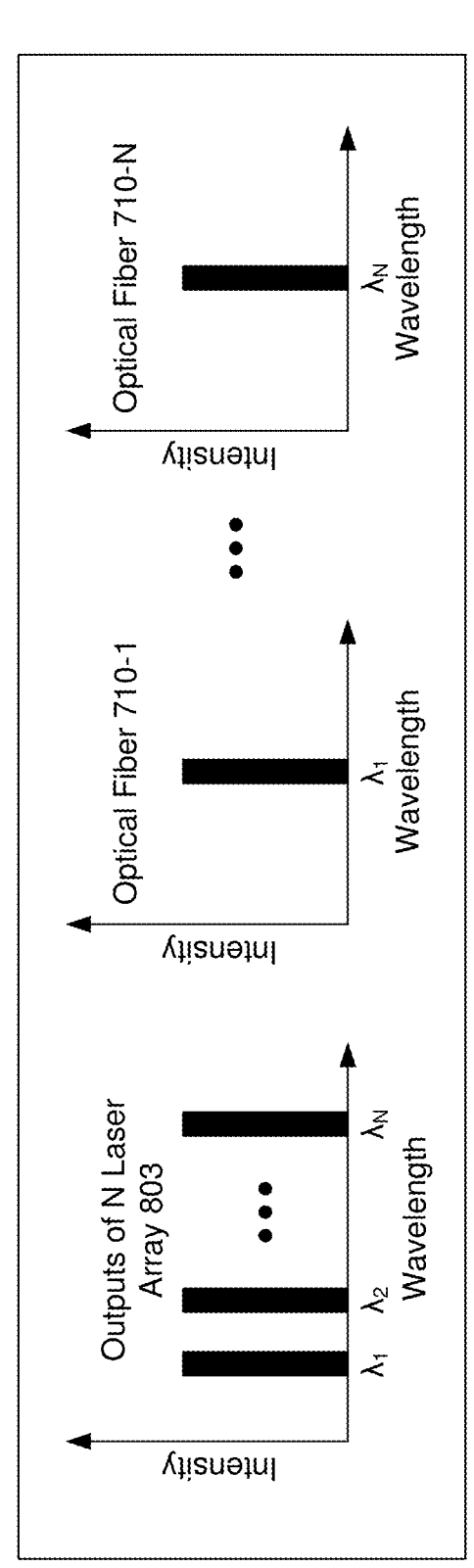
FIG. 8B shows a diagram indicating the continuous wave laser light at each of the N wavelengths ($\lambda_1$ to $\lambda_N$) as output from the laser array and as conveyed by the N optical fibers to the electro-optical chip, in accordance with some embodiments.

FIG. 8B shows a diagram indicating the CW laser light at each of the N wavelengths ($\lambda_1$ to $\lambda_N$) as output from the laser array 803 and as conveyed by the N optical fibers 710-1 to 710-N to the electro-optical chip 701, in accordance with some embodiments. In some embodiments, the remote optical power supply 801 operates to supply CW laser light at the N wavelengths ($\lambda_1$ to $\lambda_N$) at a substantially equal intensity (power) per wavelength across the N optical fibers 710-1 to 710-N, such that each of the N optical fibers 710-1 to 710-N conveys CW laser light of a different one of the N wavelengths ($\lambda_1$ to $\lambda_N$). However, in some embodiments, the optical power level of one or more of the N wavelengths ($\lambda_1$ to $\lambda_N$) of CW laser light as output from the remote optical power supply 801 is different than the optical power levels of others of the N wavelengths ($\lambda_1$ to $\lambda_N$) of CW laser light as output from the remote optical power supply 801.

In the high-bandwidth, multi-wavelength WDM optical data communication system 800, the N×M optical distribution network 603 is moved from the remote optical power supply 111 (such as shown in FIG. 6A) to the N×M optical distribution network 703 onboard the electro-optical chip 701. The remote optical power supply 801 is configured to output multiple wavelengths ($\lambda_1$ to $\lambda_N$) of CW laser light into the optical fiber array 710, such that a unique one of the multiple wavelengths ($\lambda_1$ to $\lambda_N$) of CW laser light is conveyed through a given one of the N optical fibers 710-1 to 710-N of the optical fiber array 710 to a given optical supply input port 705-1 to 705-N of the electro-optical chip 701, and in turn to a given optical input 707-1 to 707-N of the N×M optical distribution network 703 onboard the electro-optical chip 701. As compared with the remote optical power supply 111, the remote optical power supply 801 is beneficially simplified because it does not include the N×M optical distribution network 603, and because each laser 803-1 to 803-N is directly coupled to a single corresponding output optical fiber 710-1 to 710-N, respectively. It should be understood that moving the N×M optical distribution network 603 out of the remote optical power supply 111 (such as shown in FIG. 6A) significantly reduces the manufacturing complexity and cost of the remote optical power supply 801.

Figure 9A:
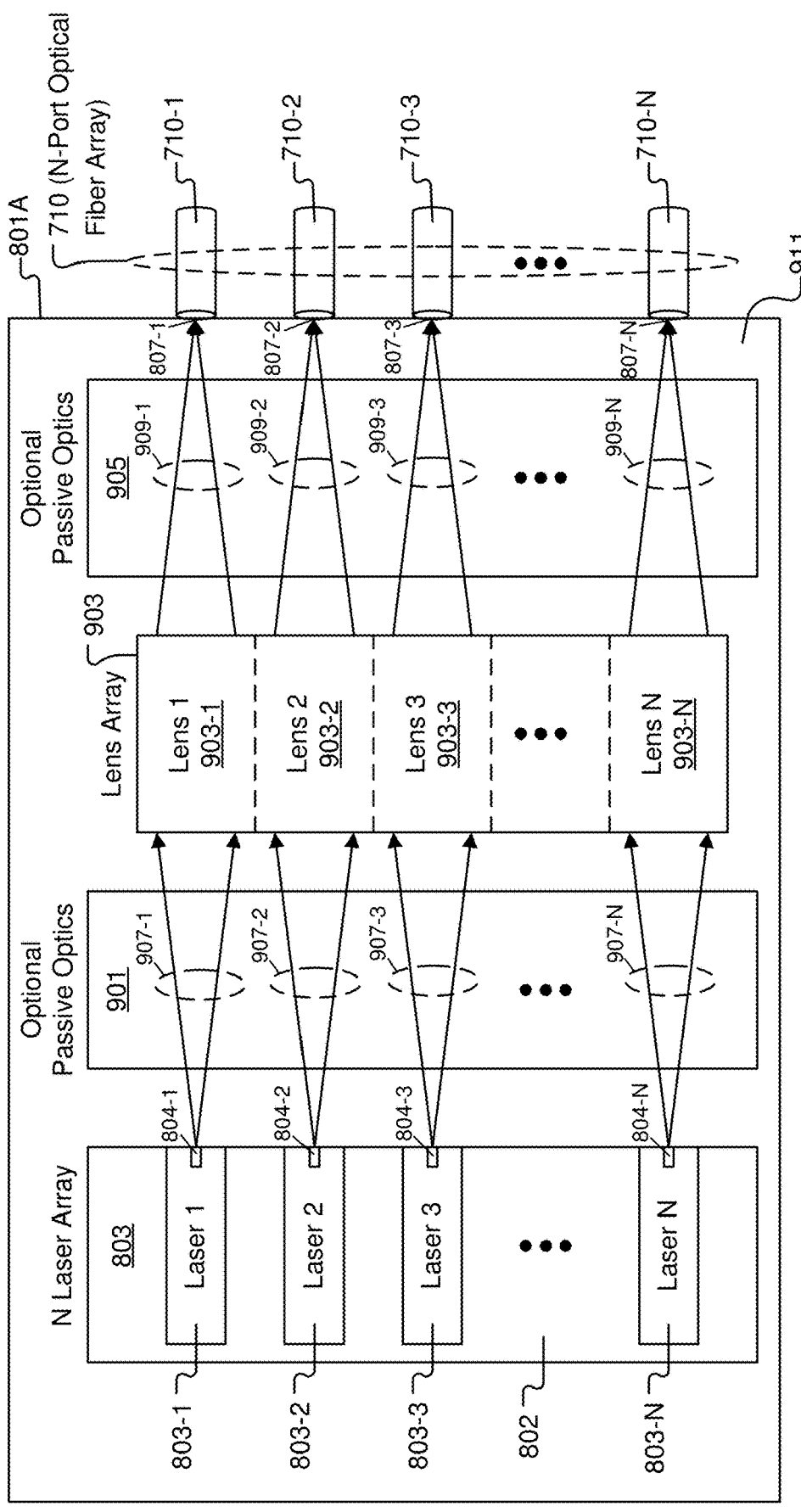
FIG. 9A shows a remote optical power supply that implements a lens array, in accordance with some embodiments.

FIG. 9A shows a remote optical power supply 801A that implements a lens array 903, in accordance with some embodiments. The remote optical power supply 801A is a variation of the remote optical power supply 801. The lens array 903 provides a lens-based laser array fiber-coupling system for optically coupling the laser array 803 to the optical fiber array 710. In some embodiments, the remote optical power supply 801A is substituted for the remote optical power supply 801 in FIG. 8A. The lens array 903 includes N lens elements 903-1 to 903-N respectively disposed between the optical outputs 804-1 to 804-N of the N lasers 803-1 to 803-N of the laser array 803 and the N optical outputs 807-1 to 807-N of the remote optical power supply 801A, which correspond to the cores of the N optical fibers 710-1 to 710-N of the optical fiber array 710. In some embodiments, each of the N lens elements 903-1 to 903-N images CW laser light from a corresponding one of the N lasers 803-1 to 803-N, as represented by respective arrow sets 907-1 to 907-N, onto a facet of a corresponding one of the optical fibers 710-1 to 710-N, as represented by respective arrow sets 909-1 to 909-N. In some embodiments, the optical fibers 710-1 to 710-N are single-mode optical fibers. In some embodiments, the optical fibers 710-1 to 710-N are polarization-maintaining optical fibers.

In some embodiments, the remote optical power supply 801A includes optional passive optical elements 901 disposed between the laser array 803 and the lens array 903. Also, in some embodiments, the remote optical power supply 801A includes optional passive optical elements 905 disposed between the lens array 903 and the N optical outputs 807-1 to 807-N of the remote optical power supply 801A corresponding to the facets of the N optical fibers 710-1 to 710-N. In various embodiments, the optional passive optical elements 901 and 905 include one or more passive discrete optical components, such as optical filters, optical isolators, optical waveplates, optical collimators, refractive optics, and/or diffractive optics, among others. In some embodiments, the passive optics 901 is an optical isolator. In some embodiments, the passive optics 905 is an optical isolator. In some embodiment, the passive optics 905 is an optical isolator and an optical waveplate, and the optical fibers 710-1 to 710-N are polarization-maintaining optical fibers. In some embodiments, the optical components of the remote optical power supply 801A (laser array 801, lens array 903, optional passive optics 901 and/or 905) are affixed either directly or indirectly to a shared mechanical mount or substrate 911.

Figure 9B:
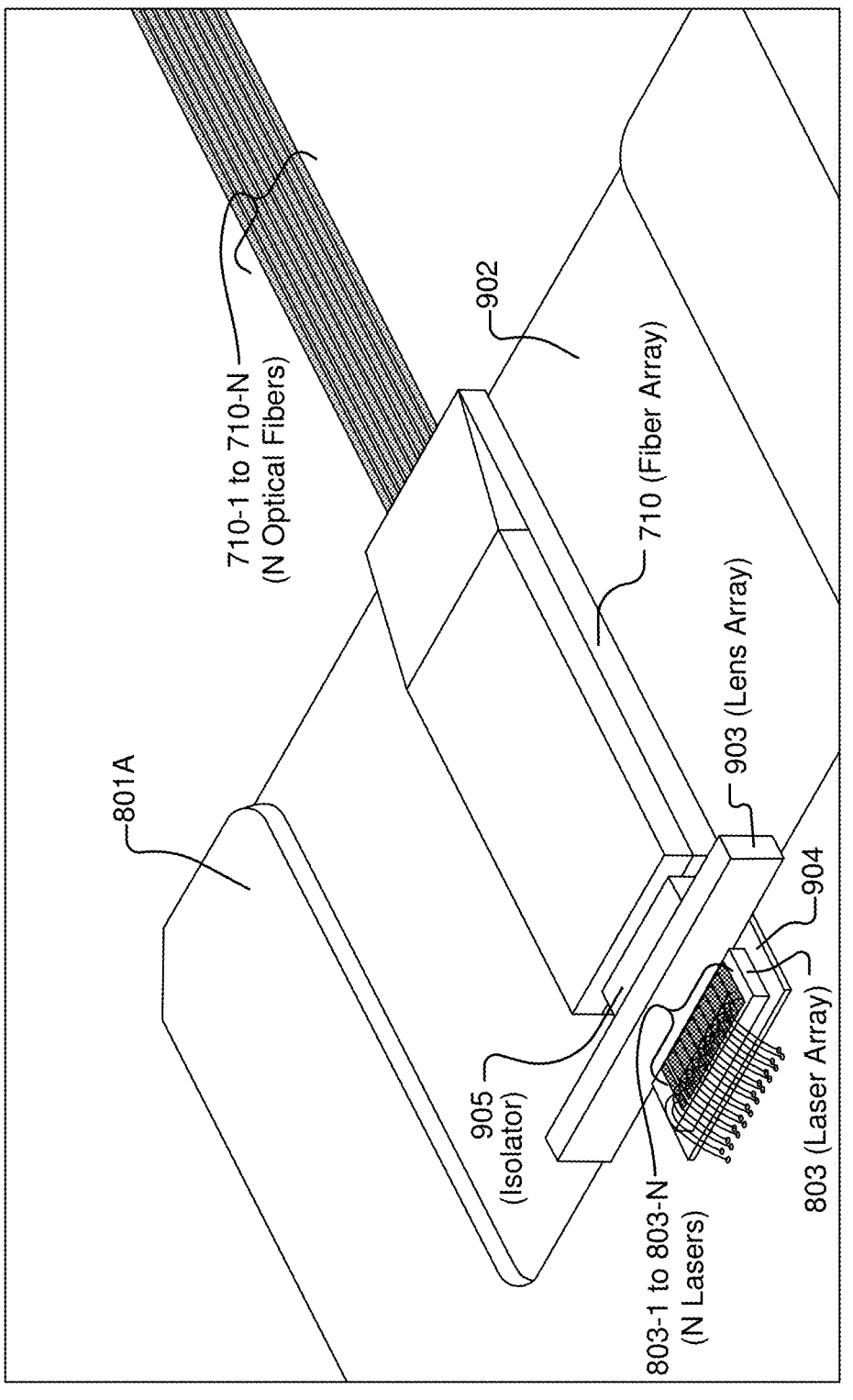
FIG. 9B shows a perspective view of the remote optical power supply of FIG. 9A, in accordance with some embodiments.
Figure 9C:
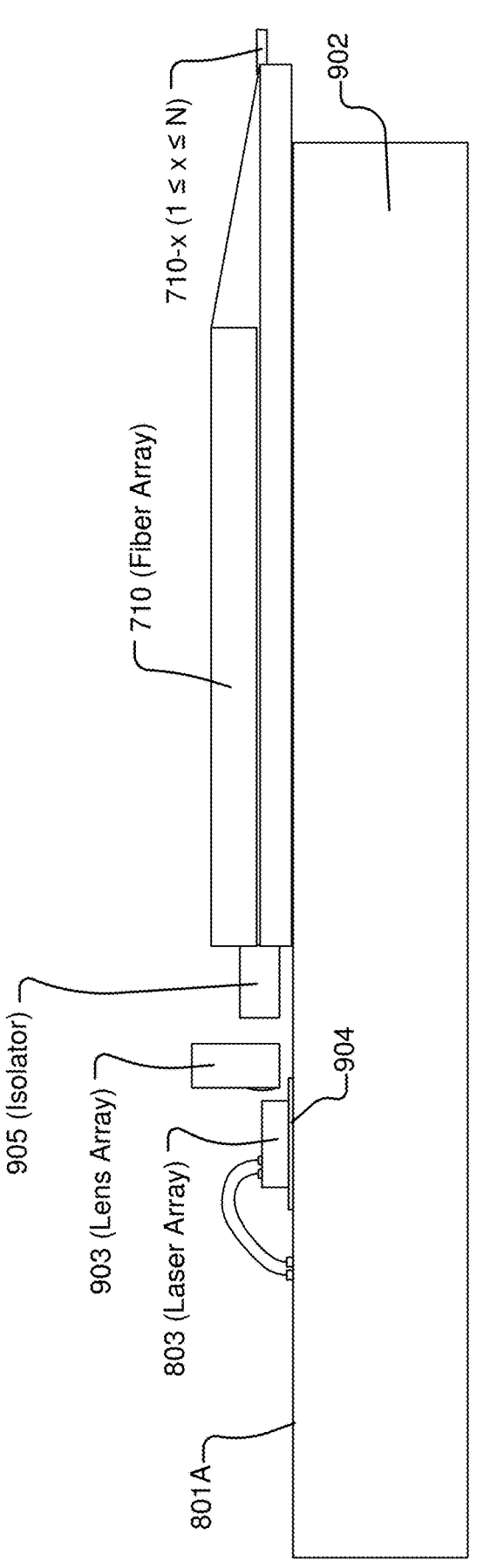
FIG. 9C shows a side view of the remote optical power supply of FIG. 9A, in accordance with some embodiments.

FIG. 9B shows a perspective view of the remote optical power supply 801A of FIG. 9A, in accordance with some embodiments. FIG. 9C shows a side view of the remote optical power supply 801A of FIG. 9A, in accordance with some embodiments. The lens array 903 is disposed between the laser array 803 and the optical fiber array 710. The lens array 903 includes a separate lens assembly for each of the lasers 803-1 to 803-N. The optical isolator 905 is disposed between the lens array 903 and the optical fiber array 710. In some embodiments, positions of the laser array 803, the lens array 903, and the optical fiber array 710 are indexed to a common substrate 902. In some embodiments, the laser array 803 is affixed to a thermally conductive substrate 904 in order to thermally connect the lasers 803-1 to 803-N, such that the temperature of any one of the lasers 803-1 to 803-N affects the temperatures of others of the lasers 803-1 to 803-N.

In an example embodiment, the electro-optical chip 701 is disclosed and including the plurality of transmit macros 205-1 to 205-M and the optical distribution network 703. Each of the plurality of transmit macros 205-1 to 205-M includes an optical waveguide 405-1 to 405-M and a plurality of ring resonators 407-1-1 to 407-M-N positioned along the optical waveguide 405-1 to 405-M within an evanescent optical coupling distance of the optical waveguide 405-1 to 405-M. The optical distribution network 703 is implemented onboard the electro-optical chip 701. The optical distribution network 703 has a plurality of optical inputs 707-1 to 707-N and a plurality of optical outputs 708-1 to 708-M. In some embodiments, the optical distribution network 703 is configured to convey a portion of light received at each and every one of the plurality of optical inputs 707-1 to 707-N to each of the plurality of optical outputs 708-1 to 708-M, such that light conveyed to each of the plurality of optical outputs 708-1 to 708-M includes all wavelengths ($\lambda_1$ to $\lambda_N$) of light conveyed to the plurality of optical inputs 707-1 to 707-N. In some embodiments, the optical distribution network 703 is configured to convey a portion of light received at a subset of the N optical inputs 707-1 to 707-N to one or more of the M optical outputs 708-1 to 708-M, such that light conveyed to said one or more of the M optical outputs 708-1 to 708-M includes a subset of wavelengths (subset of $\lambda_1$ to $\lambda_N$) of light conveyed to the N optical inputs 707-1 to 707-N. In some embodiments, each of the plurality of optical outputs 708-1 to 708-M is optically connected to the optical waveguide 405-1 to 405-M in a corresponding one of the plurality of transmit macros 205-1 to 205-M.

In some embodiments, each of the plurality of optical inputs 707-1 to 707-N of the optical distribution network 703 is optically connected to a corresponding optical fiber (one of 710-1 to 710-N). In some embodiments, CW light having a single wavelength (one of $\lambda_1$ to $\lambda_N$) is conveyed through the corresponding optical fiber (one of 710-1 to 710-N). In some embodiments, the electro-optical chip 701 includes a plurality of optical supply ports 705-1 to 705-N and a plurality of optical waveguides 706-1 to 706-N formed within the electro-optical chip 703 to respectively optically connect the plurality of optical inputs 707-1 to 707-N of the optical distribution network 703 to the plurality of optical supply ports 705-1 to 705-N. In some embodiments, the plurality of optical supply ports 705-1 to 705-N are formed as respective edge-coupling devices. In some embodiments, the plurality of optical supply ports 705-1 to 705-N are formed as respective vertical optical grating devices.

In some embodiment, the electro-optical chip 701 is configured to tune each of the plurality of ring resonators 407-1-1 to 407-M-N to a respective resonant wavelength (one of $\lambda_1$ to $\lambda_N$) that substantially matches one of a plurality of wavelengths ($\lambda_1$ to $\lambda_N$) of CW light respectively received through the plurality of optical inputs 707-1 to 707-N of the optical distribution network 703. In some embodiments, a plurality of heating devices 408-1 to 408-M are respectively disposed next to the plurality of ring resonators 407-1 to 407-M. The plurality of heating devices 408-1 to 408-M are configured to respectively control resonant wavelengths of the plurality of ring resonators 407-1 to 407-M.

In some embodiments, each optical waveguide 405-1 to 405-M within each of the plurality of transmit macros 205-1 to 205-M includes a first substantially linear-shaped segment, a second substantially linear-shaped segment, and a U-shaped segment that extends between the first substantially linear-shaped segment and the second substantially linear-shaped segment, such that an optical input of the first substantially linear-shaped segment and an optical input of the second substantially linear-shaped segment are located on a same side of said transmit macro 205-1 to 205-M that includes said optical waveguide 405-1 to 405-M. In some embodiments, the plurality of ring resonators 407-1 to 407-M with a given one of the plurality of transmit macros 205-1 to 205-M are positioned in a spaced apart manner along either the first substantially linear-shaped segment or the second substantially linear-shaped segment of the optical waveguide 405-1 to 405-M within the given one of the plurality of transmit macros 205-1 to 205-M.

In an example embodiment, an optical data communication system is disclosed. The optical data communication system includes the optical power supply 801, 801A, the electro-optical chip 701, and an optical network disposed between the optical power supply 801, 801A and the electro-optical chip 701. The optical power supply 801, 801A includes the plurality of lasers 803-1 to 803-N. Each of the plurality of lasers 803-1 to 803-N is configured to generate and output a beam of CW light of a different one of a plurality of wavelengths ($\lambda_1$ to $\lambda_N$), such that beams of CW light output by the plurality of lasers 803-1 to 803-N collectively include all of the plurality of wavelengths ($\lambda_1$ to $\lambda_N$). The electro-optical chip 701 exists separate and remote from the optical power supply 801, 801A. The electro-optical chip 701 includes a plurality of transmit macros 205-1 to 205-M. Each of the plurality of transmit macros 205-1 to 205-M includes an optical waveguide 405-1 to 405-M and a plurality of ring resonators 407-1-1 to 407-M-N positioned along the optical waveguide 405-1 to 405-M within an evanescent optical coupling distance of the optical waveguide 405-1 to 405-M.

The electro-optical chip 701 includes the optical distribution network 703 implemented onboard the electro-optical chip 701. The optical distribution network 703 has a plurality of optical inputs 707-1 to 707-N and a plurality of optical outputs 708-1 to 708-M. In some embodiments, the optical distribution network 703 is configured to convey a portion of light received at each and every one of the plurality of optical inputs 707-1 to 707-N to each of the plurality of optical outputs 708-1 to 708-M, such that light conveyed to each of the plurality of optical outputs 708-1 to 708-M includes all wavelengths ($\lambda_1$ to $\lambda_N$) of light conveyed to the plurality of optical inputs 707-1 to 707-N. In some embodiments, the optical distribution network 703 is configured to convey a portion of light received at a subset of the N optical inputs 707-1 to 707-N to one or more of the M optical outputs 708-1 to 708-M, such that light conveyed to said one or more of the M optical outputs 708-1 to 708-M includes a subset of wavelengths (subset of $\lambda_1$ to $\lambda_N$) of light conveyed to the N optical inputs 707-1 to 707-N. In some embodiments, each of the plurality of optical outputs 708-1 to 708-M of the optical distribution network 703 is optically connected to the optical waveguide 405-1 to 405-M in a corresponding one of the plurality of transmit macros 205-1 to 205-M. In some embodiments, the electro-optical chip 701 is configured to tune each of the plurality of ring resonators 407-1-1 to 407-M-N to a respective resonant wavelength that substantially matches one of the plurality of wavelengths ($\lambda_1$ to $\lambda_N$) of the beams of CW light as output by the plurality of lasers 803-1 to 803-N.

The optical network is configured to optically convey the beams of CW light as output by the plurality of lasers 803-1 to 803-N within the optical power supply 801, 801A to respective ones of the plurality of optical inputs 707-1 to 707-N of the optical distribution network 703 within the electro-optical chip 701. Each one of the plurality of optical inputs 707-1 to 707-N of the optical distribution network 703 is connected to receive a different one of the beams of CW light as output by the plurality of lasers 803-1 to 803-N.

In some embodiments, each of the plurality of lasers 803-1 to 803-N is thermally connected to at least one other of the plurality of lasers 803-1 to 803-N. In some embodiments, the plurality of lasers 803-1 to 803-N are thermally connected together, such that a change in temperature of any one of the plurality of lasers 803-1 to 803-N causes a change in temperature of others of the plurality of lasers 803-1 to 803-N. In some embodiments, each of the plurality of lasers 803-1 to 803-N is thermally connected to the common thermally conductive substrate 904 within the optical power supply 801, 801A. In some embodiments, the optical power supply 801, 801A includes an optical amplification device 805 configured to increase an optical power level of each of the beams of CW light output by the plurality of lasers 803-1 to 803-N.

In some embodiments, the optical network includes a plurality of optical fibers 710-1 to 710-N respectively optically connected to the plurality of optical inputs 707-1 to 707-N of the optical distribution network 703. In some embodiments, the optical power supply 801, 801A includes the lens array 903 disposed between the outputs of the plurality of lasers 803-1 to 803-N and the plurality of optical fibers 710-1 to 710-N of the optical network. In some embodiments, the lens array 903 includes a respective lens for each of the plurality of lasers 803-1 to 803-N. In some embodiments, the lens for a given one of the plurality of lasers 803-1 to 803-N is configured to direct the beam of CW light output by the given one of the plurality of lasers 803-1 to 803-N onto a facet of a corresponding one of the plurality of optical fibers 710-1 to 710-N. In some embodiments, the optical power supply 801, 801A includes an optical isolator 905 disposed between the lens array 903 and the plurality of optical fibers 710-1 to 710-N. The optical isolator 905 is configured to prevent light from traveling into the plurality of lasers 803-1 to 803-N.

Figure 10:
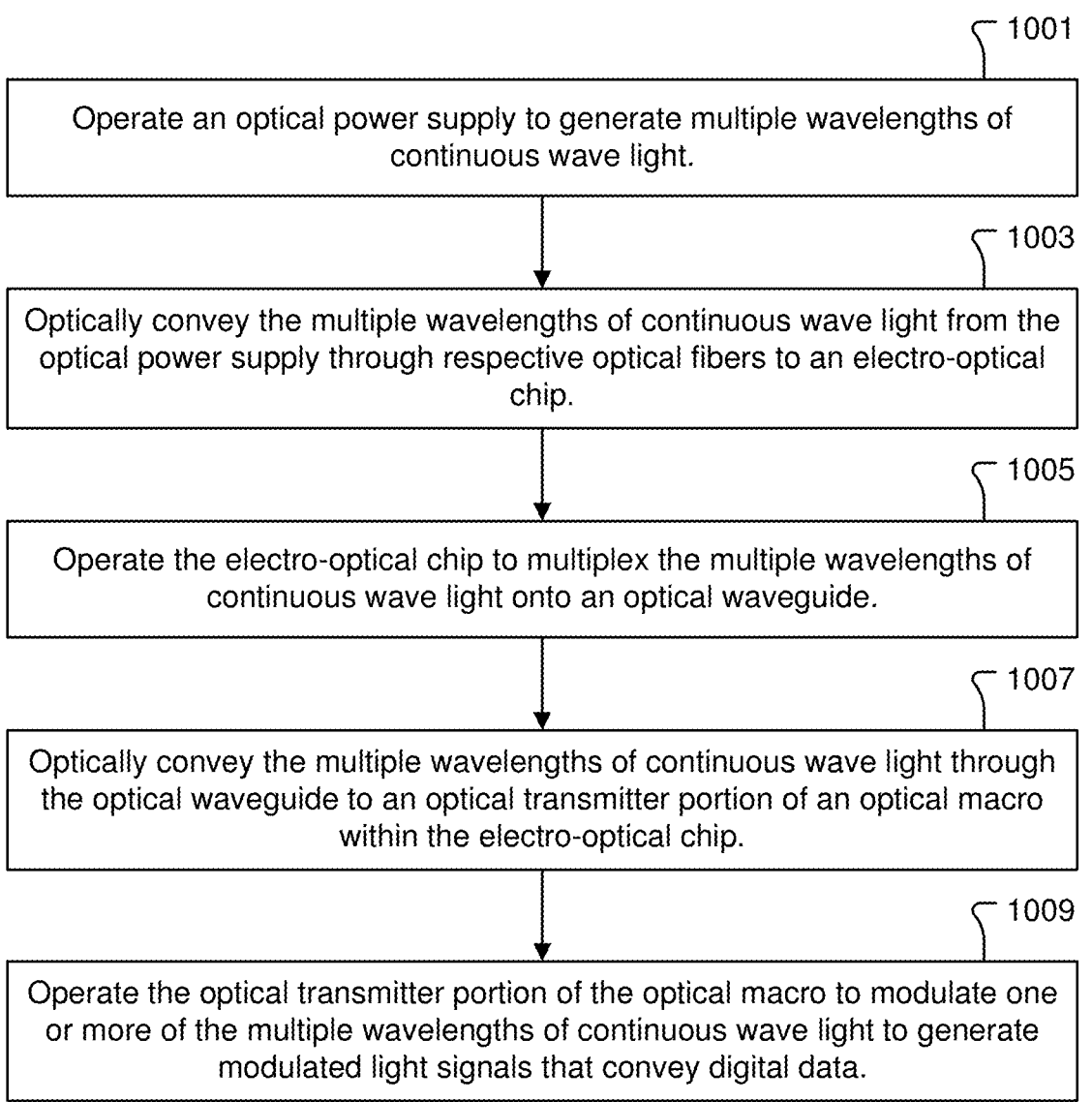
FIG. 10 shows a flowchart of a method for generating a modulated optical data communication signal, in accordance with some embodiments.

FIG. 10 shows a flowchart of a method for generating a modulated optical data communication signal, in accordance with some embodiments. In some embodiments, the method of FIG. 10 is performed by the high-bandwidth, multi-wavelength WDM optical data communication system 800. The method includes an operation 1001 for operating the optical power supply 801, 801A to generate a plurality of beams of CW light, wherein each of the plurality of beams of CW light has a different one of N wavelengths ($\lambda_1$ to $\lambda_N$). The method also includes an operation 1003 for conveying the plurality of beams of CW light from the optical power supply 801, 801A to an electro-optical chip 701 that exists separate and remote from the optical power supply 801, 801A. In this manner, the multiple wavelengths ($\lambda_1$ to $\lambda_N$) of CW laser light are conveyed from the optical power supply 801, 801A through an optical network, e.g., through respective optical fibers 710-1 to 710-N, to the electro-optical chip 701.

In some embodiments, the method also includes an operation 1005 for operating the electro-optical chip 701 to multiplex the plurality of beams of CW light onto an optical waveguide (e.g., onto any one or more of optical waveguides 709-1 to 709-M which are respectively optically connected to optical waveguides 405-1 to 405-M) within the electro-optical chip 701, such that all of the N wavelengths ($\lambda_1$ to $\lambda_N$) of the plurality of beams of CW light are coupled into the optical waveguide. In some embodiments, the operation 1005 is performed to have the electro-optical chip 701 multiplex a subset of the plurality of beams of CW light onto an optical waveguide (e.g., onto any one or more of optical waveguides 709-1 to 709-M which are respectively optically connected to optical waveguides 405-1 to 405-M) within the electro-optical chip 701, such that a subset of the N wavelengths (subset of $\lambda_1$ to $\lambda_N$) corresponding to the subset of the plurality of beams of CW light are coupled into the optical waveguide In some embodiments, the method includes operating the electro-optical chip 701 to multiplex the plurality of beams of CW light onto each of M optical waveguides, e.g., 405-1 to 405-M, that pass through transmit portions of M optical macros, e.g., 205-1 to 205-M, within the electro-optical chip 701. The method also includes an operation 1007 for conveying the plurality of beams of CW light through the optical waveguide, e.g., 405-1 to 405-M, to the optical transmitter portion of the optical macro, e.g., 205-1 to 205-M, within the electro-optical chip 701. In this manner, each of the N wavelengths ($\lambda_1$ to $\lambda_N$) of CW laser light is transmitted through the optical waveguide, e.g., 405-1 to 405-M, to the optical transmitter portion of the optical macro, e.g., 205-1 to 205-M, within the electro-optical chip 701.

The method also includes an operation 1009 for operating the optical transmitter portion of the optical macro, e.g., 205-1 to 205-M, within the electro-optical chip 701 to modulate one or more of the beams of CW light from within the optical waveguide, e.g., 405-1 to 405-M, to generate one or more modulated light signals that convey digital data for output from the electro-optical chip 701. In this manner, the optical transmitter portion of the optical macro, e.g., 205-1 to 205-M, within the electro-optical chip 701 modulates one or more of the N wavelengths ($\lambda_1$ to $\lambda_N$) of CW laser light to generate corresponding modulated light signals that convey digital data for output from the electro-optical chip 701.

In some embodiments, the operation 1005 includes conveying the plurality of beams of CW light as received from the optical power supply 801, 801A through the optical distribution network 703 implemented onboard the electro-optical chip 701. The optical distribution network 703 has the plurality of optical inputs 707-1 to 707-N and the plurality of optical outputs 708-1 to 708-M. In some embodiments, the optical distribution network 703 is configured to convey a portion of light received at each and every one of the plurality of optical inputs 707-1 to 707-N to each of the plurality of optical outputs 708-1 to 708-M, such that light conveyed to each of the plurality of optical outputs 708-1 to 708-M includes all N wavelengths ($\lambda_1$ to $\lambda_N$) of light conveyed to the plurality of optical inputs 707-1 to 707-N from the remote optical power supply 801, 801A. In some embodiments, the optical distribution network 703 is configured to convey a portion of light received at a subset of the plurality of optical inputs 707-1 to 707-N to one or more of the plurality of optical outputs 708-1 to 708-M, such that light conveyed to said one or more of the plurality of optical outputs 708-1 to 708-M includes a subset of the N wavelengths (subset of $\lambda_1$ to $\lambda_N$) of light conveyed to said subset of the plurality of optical inputs 707-1 to 707-N from the remote optical power supply 801, 801A. In some embodiments, one of the plurality of optical outputs 708-1 to 708-M of the optical distribution network 703 is optically connected to one of the optical waveguides, e.g., 405-1 to 405-M, within the electro-optical chip 701.

In some embodiments, the operation 1001 for generating the plurality of beams of CW light includes operating the plurality of lasers 803-1 to 803-N to respectively generate the plurality of beams of CW light. In some embodiments, the plurality of lasers 803-1 to 803-N are thermally connected together, such that a change in temperature of any one of the plurality of lasers 803-1 to 803-N causes a change in temperature of others of the plurality of lasers 803-1 to 803-N. In this manner, a temperature-induced drift in wavelength of any one of the plurality of beams of CW light is accompanied by a corresponding temperature-induced drift in wavelength of others of the plurality of beams of CW light. In these embodiments, the electro-optical chip 701 is configured to compensate for the temperature-induced drift in wavelength of the plurality of beams of CW light received from the remote optical power supply 801, 801A.

The foregoing description of the embodiments has been provided for purposes of illustration and description, and is not intended to be exhaustive or limiting. Individual elements or features of a particular embodiment are generally not limited to that particular embodiment, but, where applicable, are interchangeable and can be used in a selected embodiment, even if not specifically shown or described. In this manner, one or more features from one or more embodiments disclosed herein can be combined with one or more features from one or more other embodiments disclosed herein to form another embodiment that is not explicitly disclosed herein, but rather that is implicitly disclosed herein. This other embodiment may also be varied in many ways. Such embodiment variations are not to be regarded as a departure from the disclosure herein, and all such embodiment variations and modifications are intended to be included within the scope of the disclosure provided herein.

Although some method operations may be described in a specific order herein, it should be understood that other housekeeping operations may be performed in between method operations, and/or method operations may be adjusted so that they occur at slightly different times or simultaneously or may be distributed in a system which allows the occurrence of the processing operations at various intervals associated with the processing, as long as the processing of the method operations are performed in a manner that provides for successful implementation of the method.

Although the foregoing embodiments have been described in some detail for purposes of clarity of understanding, it will be apparent that certain changes and modifications can be practiced within the scope of the appended claims. Accordingly, the embodiments disclosed herein are to be considered as illustrative and not restrictive, and are therefore not to be limited to just the details given herein, but may be modified within the scope and equivalents of the appended claims.

What is claimed is:

1. An electro-optical chip, comprising:

a plurality of transmit macros, each of the plurality of transmit macros including an optical waveguide and a plurality of ring resonators positioned along the optical waveguide within an evanescent optical coupling distance of the optical waveguide; and an optical distribution network implemented onboard the electro-optical chip, the optical distribution network having a plurality of optical inputs and a plurality of optical outputs, wherein each of the plurality of optical inputs is connected to receive a single and different wavelength of light, wherein the plurality of optical inputs is delineated into a plurality of subsets of optical inputs, wherein each of the plurality of subsets of optical inputs includes at least two of the plurality of optical inputs, wherein each of the plurality of optical inputs is in any given one of the plurality of subsets of optical inputs and just in the given one of the plurality of subsets of optical inputs, wherein the plurality of optical outputs is delineated into a plurality of subsets of optical outputs, wherein each of the plurality of subsets of optical outputs includes at least two of the plurality of optical outputs, wherein each of the plurality of optical outputs is in any given one of the plurality of subsets of optical outputs and just in the given one of the plurality of subsets of optical outputs, wherein the optical distribution network is configured to convey a portion of light received at a given one of the plurality of subsets of optical inputs to a given one of the plurality of subsets of optical outputs and just to the given one of the plurality of subsets of the optical outputs, such that light conveyed to each optical output of the given one of the plurality of subsets of optical outputs includes all wavelengths of light conveyed to each of the optical inputs of the given one of the plurality of subsets of optical inputs, wherein the optical distribution network is configured so that light conveyed into the optical inputs of any one of the plurality of subsets of optical inputs is conveyed to each of the optical outputs of a corresponding one of the plurality of subsets of optical outputs, wherein each of the plurality of optical outputs is optically connected to the optical waveguide in a corresponding one of the plurality of transmit macros.

2. The electro-optical chip as recited in claim 1, wherein each of the plurality of optical inputs of the optical distribution network is optically connected to a corresponding optical fiber.

3. The electro-optical chip as recited in claim 2, wherein continuous wave light having a single wavelength is conveyed through the corresponding optical fiber.

4. The electro-optical chip as recited in claim 1, further comprising:

a plurality of optical supply ports; and a plurality of optical waveguides formed within the electro-optical chip to respectively optically connect the plurality of optical inputs of the optical distribution network to the plurality of optical supply ports.

5. The electro-optical chip as recited in claim 4, wherein the plurality of optical supply ports are formed as respective edge-coupling devices.

6. The electro-optical chip as recited in claim 4, wherein the plurality of optical supply ports are formed as respective vertical optical grating devices.

7. The electro-optical chip as recited in claim 1, wherein the electro-optical chip is configured to tune each of the plurality of ring resonators to a respective resonant wavelength that substantially matches one of a plurality of wavelengths of continuous wave light respectively received through the plurality of optical inputs of the optical distribution network.

8. The electro-optical chip as recited in claim 1, further comprising:

a plurality of heating devices respectively disposed next to the plurality of ring resonators, the plurality of heating devices configured to respectively control resonant wavelengths of the plurality of ring resonators.

9. The electro-optical chip as recited in claim 1, wherein each optical waveguide within each of the plurality of transmit macros includes a first substantially linear-shaped segment, a second substantially linear-shaped segment, and a U-shaped segment that extends between the first substantially linear-shaped segment and the second substantially linear-shaped segment, such that an optical input of the first substantially linear-shaped segment and an optical input of the second substantially linear-shaped segment are located on a same side of said transmit macro that includes said optical waveguide.

10. The electro-optical chip as recited in claim 9, wherein the plurality of ring resonators with a given one of the plurality of transmit macros are positioned in a spaced apart manner along either the first substantially linear-shaped segment or the second substantially linear-shaped segment of the optical waveguide within the given one of the plurality of transmit macros.

11. The electro-optical chip as recited in claim 1, wherein the optical distribution network is a passive photonic device.

12. The electro-optical chip as recited in claim 1, wherein the optical distribution network is dynamically configurable such that conveyance of light from a particular one of plurality of subsets of optical inputs to a particular one of plurality of subsets of optical outputs is configurable during operation of the electro-optical chip.

13. An optical data communication system, comprising:

an optical power supply including a plurality of lasers, each of the plurality of lasers configured to generate and output a beam of continuous wave light of a different one of a plurality of wavelengths;

an electro-optical chip that exists separate and remote from the optical power supply, the electro-optical chip including a plurality of transmit macros, each of the plurality of transmit macros including an optical waveguide and a plurality of ring resonators positioned along the optical waveguide within an evanescent optical coupling distance of the optical waveguide, wherein the electro-optical chip includes an optical distribution network implemented onboard the electro-optical chip, the optical distribution network having a plurality of optical inputs and a plurality of optical outputs, wherein each of the plurality of optical inputs is connected to receive a single and different wavelength of light from a corresponding beam of continuous wave light output by the optical power supply, wherein the plurality of optical inputs is delineated into a plurality of subsets of optical inputs, wherein each of the plurality of subsets of optical inputs includes at least two of the plurality of optical inputs, wherein each of the plurality of optical inputs is in any given one of the plurality of subsets of optical inputs and just in the given one of the plurality of subsets of optical inputs, wherein the plurality of optical outputs is delineated into a plurality of subsets of optical outputs, wherein each of the plurality of subsets of optical outputs includes at least two of the plurality of optical outputs, wherein each of the plurality of optical outputs is in any given one of the plurality of subsets of optical outputs and just in the given one of the plurality of subsets of optical outputs, wherein the optical distribution network is configured to convey a portion of light received at a given one of the plurality of subsets of optical inputs to a given one of the plurality of subsets of optical outputs and just to the given one of the plurality of subsets of the optical outputs, such that light conveyed to each optical output of the given one of the plurality of subsets of optical outputs includes all wavelengths of light conveyed to each of the optical inputs of the given one of the plurality of subsets of optical inputs, wherein the optical distribution network is configured so that light conveyed into the optical inputs of any one of the plurality of subsets of optical inputs is conveyed to each of the optical outputs of a corresponding one of the plurality of subsets of optical outputs, wherein each of the plurality of optical outputs of the optical distribution network is optically connected to the optical waveguide in a corresponding one of the plurality of transmit macros; and an optical network configured to optically convey the beams of continuous wave light as output by the plurality of lasers within the optical power supply to respective ones of the plurality of optical inputs of the optical distribution network within the electro-optical chip, wherein each one of the plurality of optical inputs of the optical distribution network is connected to receive a different one of the beams of continuous wave light as output by the plurality of lasers.

14. The optical data communication system as recited in claim 13, wherein each of the plurality of lasers is thermally connected to at least one other of the plurality of lasers.

15. The optical data communication system as recited in claim 13, wherein the plurality of lasers are thermally connected together, such that a change in temperature of any one of the plurality of lasers causes a change in temperature of others of the plurality of lasers.

16. The optical data communication system as recited in claim 13, wherein each of the plurality of lasers is thermally connected to a common thermally conductive substrate within the optical power supply.

17. The optical data communication system as recited in claim 13, wherein the optical power supply includes an optical amplification device configured to increase an optical power level of each of the beams of continuous wave light output by the plurality of lasers.

18. The optical data communication system as recited in claim 13, wherein the optical network includes a plurality of optical fibers respectively optically connected to the plurality of optical inputs of the optical distribution network.

19. The optical data communication system as recited in claim 13, wherein the electro-optical chip is configured to tune each of the plurality of ring resonators to a respective resonant wavelength that substantially matches one of the plurality of wavelengths of the beams of continuous wave light as output by the plurality of lasers.

20. The optical data communication system as recited in claim 13, wherein each optical waveguide within each of the plurality of transmit macros includes a first substantially linear-shaped segment, a second substantially linear-shaped segment, and a U-shaped segment that extends between the first substantially linear-shaped segment and the second substantially linear-shaped segment, such that an optical input of the first substantially linear-shaped segment and an optical input of the second substantially linear-shaped segment are located on a same side of said transmit macro that includes said optical waveguide.

21. The electro-optical chip as recited in claim 20, wherein the plurality of ring resonators with a given one of the plurality of transmit macros are positioned in a spaced apart manner along either the first substantially linear-shaped segment or the second substantially linear-shaped segment of the optical waveguide within the given one of the plurality of transmit macros.

22. The electro-optical chip as recited in claim 13, wherein the optical network includes a plurality of optical fibers optically connected to the optical power supply, wherein the optical power supply includes a lens array disposed between outputs of the plurality of lasers and the plurality of optical fibers of the optical network, the lens array including a respective lens for each of the plurality of lasers, wherein the lens for a given one of the plurality of lasers is configured to direct the beam of continuous wave light output by the given one of the plurality of lasers onto a facet of a corresponding one of the plurality of optical fibers.

23. The electro-optical chip as recited in claim 22, wherein the optical power supply includes an optical isolator disposed between the lens array and the plurality of optical fibers, the optical isolator configured to prevent light from traveling into the plurality of lasers.

24. The optical data communication system as recited in claim 13, wherein the optical distribution network is dynamically configurable such that conveyance of light from a particular one of plurality of subsets of optical inputs to a particular one of the plurality of subsets of optical outputs is configurable during operation of the electro-optical chip.

25. A method for generating a modulated optical data communication signal, comprising:

operating an optical power supply to generate a plurality of beams of continuous wave light, wherein each of the plurality of beams of continuous wave light has a different wavelength;

conveying the plurality of beams of continuous wave light from the optical power supply to an electro-optical chip that exists separate and remote from the optical power supply;

configuring an optical distribution network within the electro-optical chip, the optical distribution network having a plurality of optical inputs and a plurality of optical outputs, wherein each of the plurality of optical inputs is connected to receive a single and different wavelength of light from a corresponding beam of continuous wave light output by the optical power supply, wherein the plurality of optical inputs is delineated into a plurality of subsets of optical inputs, wherein each of the plurality of subsets of optical inputs includes at least two of the plurality of optical inputs, wherein each of the plurality of optical inputs is in any given one of the plurality of subsets of optical inputs and just in the given one of the plurality of subsets of optical inputs, wherein the plurality of optical outputs is delineated into a plurality of subsets of optical outputs, wherein each of the plurality of subsets of optical outputs includes at least two of the plurality of optical outputs, wherein each of the plurality of optical outputs is in any given one of the plurality of subsets of optical outputs and just in the given one of the plurality of subsets of optical outputs, wherein the optical distribution network is configured to convey a portion of light received at a given one of the plurality of subsets of optical inputs to a given one of the plurality of subsets of optical outputs and just to the given one of the plurality of subsets of the optical outputs, such that light conveyed to each optical output of the given one of the plurality of subsets of optical outputs includes all wavelengths of light conveyed to each of the optical inputs of the given one of the plurality of subsets of optical inputs, wherein the optical distribution network is configured so that light conveyed into the optical inputs of any one of the plurality of subsets of optical inputs is conveyed to each of the optical outputs of a corresponding one of the plurality of subsets of optical outputs;

conveying light from the plurality of optical outputs of the optical distribution network into a respective plurality of optical waveguides of a respective plurality of transmit macros within the electro-optical chip; and operating the plurality of transmit macros within the electro-optical chip to generate one or more modulated light signals that convey digital data.

26. The method as recited in claim 25, wherein operating the optical power supply to generate the plurality of beams of continuous wave light includes operating a plurality of lasers to respectively generate the plurality of beams of continuous wave light, wherein the plurality of lasers are thermally connected together, such that a change in temperature of any one of the plurality of lasers causes a change in temperature of others of the plurality of lasers, such that a temperature-induced drift in wavelength of any one of the plurality of beams of continuous wave light is accompanied by a corresponding temperature-induced drift in wavelength of others of the plurality of beams of continuous wave light.

27. The method as recited in claim 25, further comprising:

configuring the optical distribution network during operation of the electro-optical chip such that light from a particular one of plurality of subsets of optical inputs is conveyed to a particular one of the plurality of subsets of optical outputs.

* * * * *